(12) United States Patent
Hwang et al.

(10) Patent No.: US 11,302,913 B2
(45) Date of Patent: Apr. 12, 2022

(54) NEGATIVE ELECTRODE MATERIAL COMPRISING SILICON FLAKES AND PREPARING METHOD OF SILICON FLAKES

(71) Applicants: LG CHEM, LTD., Seoul (KR); UNIST (ULSAN NATIONAL INSTITUTE OF SCIENCE AND TECHNOLOGY), Ulsan (KR)

(72) Inventors: Eui-Yong Hwang, Daejeon (KR); Soo-Jin Park, Ulsan (KR); Jae-Geon Ryu, Ulsan (KR); Jang-Bae Kim, Daejeon (KR); Jong-Hyun Chae, Daejeon (KR); Dong-Ki Hong, Ulsan (KR)

(73) Assignees: LG CHEM, LTD., Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 323 days.

(21) Appl. No.: 16/082,021
(22) PCT Filed: Aug. 18, 2017
(86) PCT No.: PCT/KR2017/009065
§ 371 (c)(1),
(2) Date: Sep. 4, 2018
(87) PCT Pub. No.: WO2018/034553
PCT Pub. Date: Feb. 22, 2018

(65) Prior Publication Data
US 2020/0119344 A1 Apr. 16, 2020

(30) Foreign Application Priority Data
Aug. 18, 2016 (KR) ........................ 10-2016-0104774

(51) Int. Cl.
*H01M 4/00* (2006.01)
*H01M 4/38* (2006.01)
(Continued)

(52) U.S. Cl.
CPC ........... *H01M 4/386* (2013.01); *C01B 33/021* (2013.01); *H01M 4/133* (2013.01); *H01M 4/134* (2013.01);
(Continued)

(58) Field of Classification Search
CPC .................................................... H01M 4/386
See application file for complete search history.

(56) References Cited

U.S. PATENT DOCUMENTS 10,763,501 B2 * 9/2020 Feaver ................. H01M 4/386
2013/0045420 A1 2/2013 Biswal et al.
(Continued)

FOREIGN PATENT DOCUMENTS

CN 105047892 A 11/2015
CN 105084365 A 11/2015
(Continued)

OTHER PUBLICATIONS

Ge et al., "Review of porous silicon preparation and its application for lithium-ion battery anodes," Nanotechnology, vol. 24, No. 422001, 2013, pp. 1-10, XP002790398.
(Continued)

*Primary Examiner* — Milton I Cano
*Assistant Examiner* — Mary G Henshaw
(74) *Attorney, Agent, or Firm* — Birch, Stewart, Kolasch & Birch, LLP

(57) ABSTRACT

The present disclosure relates to a negative electrode material including, as an active material, silicon flakes with a hyperporous structure, represented by the following chemical formula 1:

$$xSi.(1-x)A \quad (1)$$

where $0.5 \leq x \leq 1.0$, and
A is an impurity, and includes at least one compound selected from the group consisting of $Al_2O_3$, MgO,
(Continued)

$SiO_2$, $GeO_2$, $Fe_2O_3$, CaO, $TiO_2$, $Na_2O$ $K_2O$, CuO, ZnO, NiO, $Zr_2O_3$, $Cr_2O_3$ and BaO, and a preparing method of the silicon flakes.

7 Claims, 38 Drawing Sheets

(51) Int. Cl.
*C01B 33/021* (2006.01)
*H01M 4/133* (2010.01)
*H01M 4/134* (2010.01)
*H01M 4/36* (2006.01)
*H01M 4/02* (2006.01)

(52) U.S. Cl.
CPC ......... *H01M 4/366* (2013.01); *C01P 2006/12* (2013.01); *C01P 2006/17* (2013.01); *H01M 2004/027* (2013.01)

(56) References Cited

U.S. PATENT DOCUMENTS

| | | |
|---|---|---|
| 2013/0280612 A1 | 10/2013 | Lee et al. |
| 2014/0147751 A1 | 5/2014 | Yang et al. |
| 2014/0377643 A1 | 12/2014 | Lee et al. |
| 2014/0377653 A1 | 12/2014 | Park et al. |
| 2015/0079472 A1 | 3/2015 | Lin et al. |
| 2015/0104705 A1 | 4/2015 | Canham et al. |
| 2016/0308205 A1* | 10/2016 | Canham ................ H01M 4/386 |

FOREIGN PATENT DOCUMENTS

| | | |
|---|---|---|
| JP | 2014-513385 A | 5/2014 |
| JP | 2014-525851 A | 9/2014 |
| JP | 2015-525189 A | 9/2015 |
| KR | 10-2013-0118192 A | 10/2013 |
| KR | 10-2014-0082571 A | 7/2014 |
| KR | 10-2014-0141488 A | 12/2014 |
| KR | 10-2015-0000069 A | 1/2015 |
| KR | 10-2015-0032155 A | 3/2015 |
| KR | 10-1544088 B1 | 8/2015 |
| KR | 10-2016-0037334 A | 4/2016 |
| KR | 10-2016-0085998 A | 7/2016 |
| WO | WO 2014/102219 A1 | 7/2014 |
| WO | WO 2015/082920 A1 | 6/2015 |

OTHER PUBLICATIONS

Liu et al., "Energy storage materials from nature through nanotechnology: a sustainable route from reed plants to a silicon anode for lithium-ion batteries," Angewandte Chemie International Edition, vol. 54, 2015, pp. 9632-9636, XP002790399.

International Search Report (PCT/ISA/210) issued in PCT/KR2017/009065, dated Dec. 4, 2017.

Ryu et al., "Multiscale Hyperporous Silicon Flake Anodes for High initial Coulombic Efficiency and Cycle Stability", ACS Nano, Nov. 10, 2016, vol. 10, No. 11, pp. 10589-10597, See pp. 10590, 10591 (right paragraph), 10535-10536 (Methods).

Ryu et al., "Synthesis of Ultrathin Si Nanosheets from Natural Clays for Lithium-Ion Battery Anodes", ACS Nano, vol. 10, 2016, pp. 2843-2851.

* cited by examiner

NEGATIVE ELECTRODE MATERIAL COMPRISING SILICON FLAKES AND PREPARING METHOD OF SILICON FLAKES

TECHNICAL FIELD

The present disclosure relates to a negative electrode material comprising silicon flakes and a preparing method of silicon flakes.

The present application claims the benefit of Korean Patent Application No. 10-2016-0104774 filed on Aug. 18, 2016 with the Korean Intellectual Property Office, the disclosure of which is incorporated herein by reference in its entirety.

BACKGROUND ART

As the use of fossil fuels dramatically increases, it is required to use alternative energy and clean energy more and more, and in this circumstance, studies are made most intensively in the field of power generation and storage using electrochemistry.

Currently, a typical example of electrochemical devices using electrochemical energy is secondary batteries, and the range of applications is gradually expanding.

With the technology development and the increasing demand for mobile devices such as portable computers, mobile phones and cameras, the demand for secondary batteries as a source of energy is dramatically increasing at recent years, and among secondary batteries, lithium secondary batteries with high energy density and operating potential, a long cycle life and a low self-discharge rate have extensively been studied, and are commercialized and come into widespread use.

In addition, with the increasing interest in environmental issue, many studies are being made on electric vehicles and hybrid electric vehicles that provide an alternative to cars using fossil fuels such as gasoline cars and diesel cars, known as one of the main causes of air pollution. Nickel/metal hydride secondary batteries are primarily used as a source of power for electric vehicles and hybrid electric vehicles, but lithium secondary batteries with high energy density and discharge voltage are intensively being studied and some manufacturers are commercializing products.

Materials including graphite are widely used as a negative electrode (anode) active material of lithium secondary batteries. Materials including graphite have an average potential of about 0.2V (for Li/Li+) when disintercalating lithium, and during discharge, the potential changes relatively uniformly. By this reason, an advantage is a high and uniform battery voltage. However, graphite materials have an electrical capacity per unit mass as low as 372 mAh/g, but the capacity of graphite materials has been improved and now gets close to the theoretical capacity, so it is difficult to further increase the capacity.

For higher capacity of lithium secondary batteries, many negative electrode active materials are being studied. Negative electrode active materials with high capacity include materials that form lithium-metal compounds, and for example, silicon or tin is expected to be a promising negative electrode active material. Particularly, silicon is an alloy type negative electrode active material having a theoretical capacity (4,200 mAh/g) that is at least about 10 times higher than graphite, and is today gaining attention as a negative electrode active material of lithium secondary batteries.

However, silicon has a large volume change (~300%) during charge/discharge, causing the mechanical contact between materials to break, resulting in spalling, and as a consequence, ionic conductivity and electrical conductivity reduces, and life characteristics tend to reduce sharply in real situation.

Accordingly, to solve the problem with volume change of Si, a bottom-up approach to design/synthesize Si with nanostructure is recently receiving much attention, but its downside is an intricate production process, low yield and high production costs, making commercialization difficult.

To apply silicon to lithium secondary batteries, there is an urgent need for development of technology to improve life characteristics and rate characteristics and minimize volume changes during charge/discharge.

DISCLOSURE

Technical Problem

Therefore, the present disclosure is aimed at solving the problem of the related art and the technical problem that has been long requested.

After in-depth studies and various experiments, the inventors completed the present disclosure based on the findings that synthesis of flake shaped silicon with hyperporous structure from low-priced clay using a metal reducing agent leads to production cost reduction and simple production process, and fabrication of a lithium secondary battery using the resulting silicon flakes as a negative electrode active material has effects in buffering volume expansion during charge/discharge and improving life characteristics and rate characteristics.

Technical Solution

To achieve this object, a negative electrode material of the present disclosure includes, as an active material, silicon flakes with hyperporous structure, represented by the following chemical formula 1:

$$x\text{Si}\cdot(1-x)\text{A} \qquad (1)$$

In the formula,
0.5≤x≤1.0;
A is an impurity, and includes at least one compound selected from the group consisting of $Al_2O_3$, MgO, $SiO_2$, $GeO_2$, $Fe_2O_3$, CaO, $TiO_2$, $Na_2O$ $K_2O$, CuO, ZnO, NiO, $Zr_2O_3$, $Cr_2O_3$ and BaO.

Here, the x is a weight ratio, and the 'silicon flake' specifically refers to a plate structure or substantial plate structure in which silicon atoms having 2-dimensional (2D) crystal shape or tetrahedral crystal shape are periodically arranged in 2 dimensions.

Furthermore, the 'hyperporous structure' refers to a structure in which macropores, mesopores and micropores classified based on the pore size are formed together.

Accordingly, the silicon flakes with hyperporous structure may have a hyperporous structure, for example, including macropores having the pore size in the range of greater than 50 nm to 500 nm, mesopores having the pore size of greater than 2 nm to 50 nm, and micropores having the pore size of 0.5 nm to 2 nm.

The hyperporous structure is formed when the silicon flakes of the present disclosure are synthesized, and as described below, the silicon flakes of the present disclosure are synthesized by a metallothermic reduction method that thermally treats clay and a metal reducing agent. In this case, first, mesopores and micropores are formed together on the surface of clay through surface reaction of clay and a metal reducing agent, and macropores are not formed. Subsequently, as the reaction progresses, the metal reducing agent penetrated into the clay through the mesopores and micropores formed on the surface causes an internal reduction reaction to take place, metal oxide produced inside plays a role in forming macropores later and macropores are formed at the position of the metal oxide through subsequent post-treatment for removing the metal oxide, completing a hyperporous structure.

When the silicon flakes with hyperporous structure are used as a negative electrode active material, volume expansion of silicon can be alleviated by the hyperporous structure during charge/discharge, and there is an effect on the marked improvements in life characteristics and rate characteristics appearing by increasing the contact area with an electrolyte and reducing the movement distance of lithium ions.

To exert the intended effects more effectively, and achieve high capacity per volume, the pores of the silicon flakes with hyperporous structure may have an average pore diameter of 100 nm to 150 nm, and a porosity of 10% to 50%, specifically 10% to 30%, based on the total volume.

Furthermore, the BET surface area of the silicon flakes may be 70 $m^2/g$ to 250 $m^2/g$. Specifically, the BET surface area may be 120 $m^2/g$ to 210 $m^2/g$, and more specifically, 150 $m^2/g$ to 190 $m^2/g$.

Here, the porosity was roughly calculated based on the total pore volume and tap density, and the BET surface area was measured by N2 adsorption-desorption isotherm measurement using Micromeritics ASAP 2020 instrument. In addition, the average pore diameter was calculated by applying BJH (Barrett, Johner and Halenda) equation to the result.

Furthermore, the silicon flakes may have a thickness of 20 to 100 nm, and a size of 200 nm to 50 μm, but is not limited thereto.

However, when the silicon flakes are thin enough to satisfy the range and large in size, it is more preferred because the movement distance of lithium ions can be effectively reduced and impregnation of an electrolyte is easy. Specifically, the silicon flakes may have a thickness of 30 to 50 nm, and a size of 1 μm to 5 μm.

When a stack of silicon flakes is a unit (one), one flake may be formed, but 2 to 6 flakes, specifically 2 to 4 flakes may be stacked according to the synthesis conditions for forming silicon flakes, but is not limited thereto. When silicon flakes are used as a negative electrode active material of a lithium secondary battery, two or more silicon flakes stacked may be used. Accordingly, it is obvious that 'including silicon flakes as an active material' encompasses a stack of one or more silicon flakes when a silicon flake shaped material is a unit.

Meanwhile, when the silicon flakes according to the present disclosure are used as an active material, carbon coating may be performed to increase electronic conductivity and improve the rate characteristics.

In this instance, the carbon coating may be carried out as an additional process in the preparation of the silicon flakes, and a detailed description is provided in the following preparing method.

The carbon coating may have a thickness of 1 to 100 nm, specifically 3 to 30 nm, and more specifically, 5 nm to 15 nm.

When the range is satisfied, rate characteristics sought to obtain from the carbon coating are improved and uniform carbon coating is formed, and as a result, electrochemical performance is improved, and a suitable amount of silicon for achieving high capacity to the total volume is ensured, thereby preventing the capacity reduction problem.

Meanwhile, the present disclosure also provides a preparing method of the silicon flakes including:
i) thermally treating a mixture of clay and a metal reducing agent at 500° C. to 800° C. for 30 minutes to 6 hours;
ii) adding the thermally treated mixture to an acidic solution and stirring; and
iii) obtaining silicon flakes with hyperporous structure from the stirred result.

According to the method, when the uniform mixture of the clay and the metal reducing agent is subjected to reaction around the melting point of the metal reducing agent, the metal reducing agent starts to melt, causing reduction reaction to take place on the clay surface, so that silica in the outermost layer is reduced to silicon, releasing an excessive amount of heat. The released heat is transferred to a lower layer composed of metal oxide in the clay, and the metal oxide acts as a negative catalyst and a heat scavenger to mitigate the excessive amount of heat generated from the reduction reaction. Subsequently, macropores are formed at the position of the metal oxide through acidic solution post-treatment to remove the metal oxide, and silicon flakes with hyperporous structure are obtained together with the existing mesopores and micropores.

In this instance, the clay used to obtain the silicon flakes may have a layered structure, and specifically, may have a structure corresponding to a plate structure corresponding to the shape of the silicon flakes.

As described above, high-purity silicon with the purity of 90 wt % or higher, specifically 95 wt % or higher can be obtained from redundant and low-priced clay, and by the preparing method, it is thus very good in aspects of production costs and process.

Specifically, the clay includes, but is not limited to, any clay having a layered structure, and may be clay including a mineral selected from the group consisting of montmorillonite, mica, talc, and their combination as a clay mineral, and specifically, talc.

The type of metal oxide may change depending on the type of mineral included in the clay, and accordingly, the metal reducing agent for obtaining silicon by reducing silica included in the clay may be the same metal as metal oxide except silicon oxide included in the clay, and specifically, may be a metal selected from the group consisting of Al, Mg, Ge, Fe, Ca, Ti, Cu, Zn, Ni, Zr, Cr, Ba and their combination, specifically, Al or Mg. The metal reducing agent may be, specifically, in the form of powder, but is not limited thereto.

In the i) process, a mix ratio between the clay and the metal reducing agent may be such that a mole ratio between oxygen of silicon oxide included in the clay and the metal reducing agent is from 1:0.5 to 1:2.

When the amount of metal reducing agent is too much beyond the range, the metal reducing agent may be rather an impurity, and when the amount of metal reducing agent is too little, silica that is not reduced to silicon may remain behind, unfavorably resulting in low purity.

The mixture of the clay and the metal reducing agent goes through thermal treatment, and by the thermal treatment, silica included in the clay is reduced into silicon flakes, and the metal reducing agent is oxidized. This process can be, as an example, represented by the following chemical formula:

The i) thermal treatment process for reduction reaction is performed at 500° C. to 800° C. for 30 minutes to 6 hours, and specifically, may be performed at 600° C. to 800° C. for 1 hour to 3 hours.

When the temperature is too low or the time is short beyond the range, reduction of silica included in the clay is insufficient, failing to obtain silicon flakes, and when the temperature is too high or the time is long, a hyperporous structure of desired shape cannot be obtained due to crystal structure rearrangement.

Furthermore, the thermal treatment may be performed under atmosphere including inert gas, and specifically, may be performed under atmosphere including gas selected from the group consisting of nitrogen gas, argon gas, neon gas, helium gas and their combination, specifically under argon gas atmosphere.

The metal reducing agent oxidized in the process produces oxide which acts as an impurity, and only the reduced silicon flakes can be obtained with high purity by removing the impurity by stirring with an acidic solution in the subsequent ii) process.

In this instance, the ii) stirring process in the acidic solution may include stirring in a first acidic solution; and stirring in a second acidic solution in a sequential order.

The double stirring in the acidic solution is for completely removing metal oxide existing in the mixture having undergone reduction reaction through thermal treatment and unreacted silica residual.

Specifically, the acidic solution used to remove metal oxide and silica may be selected from the group consisting of hydrochloric acid, nitric acid, sulfuric acid, phosphoric acid, hydrofluoric acid, perchloric acid, chloric acid, chlorous acid, hypochlorous acid, iodic acid, and their combination. That is, each of the first acidic solution and the second acidic solution may be independently selected from the group consisting of hydrochloric acid, nitric acid, sulfuric acid, phosphoric acid, hydrofluoric acid, perchloric acid, chloric acid, chlorous acid, hypochlorous acid, iodic acid, and their combination. More specifically, the first acidic solution may be hydrochloric acid, and the second acidic solution may be hydrofluoric acid. The hydrochloric acid plays a role in dissolving metal oxide, and the hydrofluoric acid plays a role in dissolving silica.

The stirring process with the acidic solution may be appropriately determined based on an amount of remaining impurities, and specifically, may be performed at 24° C. to 40° C. for 5 minutes to 5 hours, and when the first acidic solution is hydrochloric acid, the stirring time with the first acidic solution may be specifically 2 hours to 5 hours at 30° C. to 40° C., and when the second acidic solution is hydrofluoric acid, the stirring time with the second acidic solution may be 5 minutes to 30 minutes at room temperature.

The impurity-free material yields silicon flakes with hyperporous structure from the stirred result in the iii) process. A method for obtaining or separating silicon flakes with hyperporous structure is not limited to a particular type, but for example, may be performed through filtering or a centrifugal separator.

A method for obtaining the result included in the solution using the centrifugal separator is known in the art, and specifically, the filtering may be a method through a vacuum filter, and a method for obtaining the result through the vacuum filter may include appropriately setting up the vacuum filter, and pouring the stirred solution into a vacuum filter container to separate the acidic solution and other solvents from silicon flakes.

In this instance, the method for obtaining using the centrifugal separator has problems with a minimum solvent volume of 200 ml or more, and incomplete separation in the case of a neutral solution with the acidic solution, and specifically, it is more desirable to synthesize silicon flakes with hyperporous structure from the stirred material through the filtering.

Meanwhile, the preparing method of the silicon flakes may further include:

iv) thermally treating with providing carbon containing gas to the obtained silicon flakes.

Through this process, carbon-coated silicon flakes can be obtained.

In this instance, the carbon containing gas may be selected from acetylene gas, ethylene gas, propylene gas, methane gas, ethane gas and their combination, and specifically, may be acetylene gas.

Furthermore, the iv) thermal treatment process for coating with carbon through carbon containing gas may be performed at 500° C. to 1,000° C. for 1 minute to 30 minutes, and specifically, for 1 minute to 10 minutes.

When the process is performed at too low temperature or for too short time beyond the range, a desired degree of carbon coating is not achieved, and when the process is performed at too high temperature or for too long time, the crystal structure and hyperporous structure of silicon flakes are affected, and the structure may be changed to a structure that forms a complex with silicon flakes, not a structure that coats with carbon.

When silicon flakes are coated with carbon using carbon containing gas at the end of preparation, carbon has connectivity while not clogging the pores of silicon, so that an electron movement path is effectively formed and silicon flakes are coated in gas state, achieving uniform coating on the surface of silicon flakes, and thus, when reaction is induced with an addition of a carbon compound together in the course of preparation, a complex of silicon and the carbon compound is formed, and as the carbon compound forms a complex with silicon, the carbon compound may hamper the formation of pores, and silicon carbide may be formed due to an excessive amount of heat generated during metallothermic reduction reaction, but because silicon carbide is electrochemically inactive, it is better in aspects of structural maintenance of silicon flakes, uniform carbon coating and prevention of loss of active material.

The present disclosure also provides a negative electrode including the negative electrode material and a secondary battery including the negative electrode.

The secondary battery according to the present disclosure generally includes a positive electrode, a negative electrode, a separator and a lithium salt containing non-aqueous electrolyte. Accordingly, components that make up the lithium secondary battery other than the negative electrode material according to the present disclosure described above are described below.

The positive electrode is manufactured by applying a mixture of a positive electrode active material, a conductive material and a binder to a positive electrode current collector and drying it, and a filler may be added to the mixture if necessary.

The positive electrode active material includes, but is not limited to, layered compound such as lithium cobalt oxide ($LiCoO_2$), lithium nickel oxide ($LiNiO_2$) or compounds with one or more transition metal substitution; lithium manganese oxide of chemical formula $Li_{1+y}Mn_{2-y}O_4$ (in which y is 0~0.33) such as $LiMnO_3$, $LiMn_2O_3$, $LiMnO_2$; lithium copper oxide ($Li_2CuO_2$); vanadium oxide such as $LiV_3O_8$, LiFe$_3$O$_4$, V$_2$O$_5$, Cu$_2$V$_2$O$_7$; Ni-site lithium nickel oxide represented by chemical formula LiNi$_{1-y}$M$_y$O$_2$ (in which M=Co, Mn, Al, Cu, Fe, Mg, B or Ga, y=0.01~0.3); lithium manganese composite oxide represented by chemical formula LiMn$_{2-y}$M$_y$O$_2$ (in which M=Co, Ni, Fe, Cr, Zn or Ta, y=0.01~0.1) or Li$_2$Mn$_3$MO$_8$ (in which M=Fe, Co, Ni, Cu or Zn); LiMn$_2$O$_4$ with partial substitution of alkali earth metal ion for Li in chemical formula; disulfide compound; Fe$_2$(MoO$_4$)$_3$.

The conductive material is generally present in an amount of 1 to 50 wt % based on the total weight of the mixture including the positive electrode active material. The conductive material is not limited to any particular type if it has conductivity while not causing a chemical change to the corresponding battery, and for example, graphite such as graphene, graphite pellet, natural graphite or artificial graphite; carbon black such as carbon black, acetylene black, ketjen black, channel black, furnace black, lamp black and thermal black; carbon fiber such as CNT or conductive fiber such as metal fiber; metal powder of fluorinated carbon, aluminum, nickel powder; conductive whisker of zinc oxide and potassium titanate; conductive metal oxide such as titanium oxide; conductive material such as polyphenylene derives.

The binder is a component that assists in binding the active material to the conductive material and to the current collector, and is generally present in an amount of 1 to 50 wt % based on the total weight of the mixture including the positive electrode active material. Examples of the binder include polyvinylidene fluoride, polyvinyl alcohol, polyacrylic acid (PAA), carboxymethyl cellulose (CMC), starch, hydroxypropyl cellulose, regenerated cellulose, polyvinylpyrrolidone, tetrafluoroethylene, polyethylene, polypropylene, ethylene-propylene-diene ter polymer (EPDM), sulfonated EPDM, styrene-butadiene rubber, fluorine rubber, and a variety of copolymers.

The filler is a component that inhibits the expansion of the positive electrode and is optionally used, and the filler is not limited to any particular type if it is a fibrous material while not causing a chemical change to the corresponding battery, and for example, includes olefin-based polymer such as polyethylene and polypropylene; fibrous material such as glass fiber and carbon fiber.

The positive electrode current collector is formed 3 to 500 μm in thickness. The positive electrode current collector is not limited to any particular type if it has high conductivity while not causing a chemical change to the corresponding battery, and for example, includes stainless steel, aluminum, nickel, titanium, sintered carbon, or aluminum or stainless steel surface treated with carbon, nickel, titanium, and silver. The current collector may have fine surface texture to increase the adhesion of the positive electrode active material, and may come in various types including films, sheets, foils, nets, porous materials, foams, and nonwovens.

The negative electrode is manufactured by binding a negative electrode material, i.e., a mixture of an active material, a conductive material and a binder to a negative electrode current collector according to common methods known in the art, and plays a role in intercalating and deintercalating lithium ions in the same way as the positive electrode.

In addition to silicon flakes defined in the present disclosure, the negative electrode active material may further include carbon material composed only of carbon atoms with completely crystalized structure (ordered structure) by thermal treatment at the temperature of 2000° C. or above, for example, carbon black such as natural graphite, artificial graphite, channel black, acetylene black, ketjen black and furnace black, Kish graphite (KG), SFG series (SFG-6, SFG-15, etc.), highly oriented pyrolytic graphite, Mesophase pitch based carbon fiber (MPCF), MCMB series (MCMB 2800, MCMB 2700, MCMB 2500, etc.).

The negative electrode current collector is formed 3 to 500 μm in thickness. The negative electrode current collector is not limited to any particular type if it has conductivity while not causing a chemical change to the corresponding battery, and for example, includes copper, stainless steel, aluminum, nickel, titanium, sintered carbon, copper or stainless steel surface treated with carbon, nickel, titanium, and silver, and aluminum-cadmium alloy. Furthermore, similar to the positive electrode current collector, the negative electrode current collector may have fine surface texture to enhance the bond strength of the negative electrode active material, and may come in various types including films, sheets, foils, nets, porous materials, foams, and nonwovens.

The negative electrode is manufactured by applying a mixture of the negative electrode active material, the conductive material and the binder to the negative electrode current collector and drying it, and a filler may be added to the mixture if necessary. In this instance, the type and amount of the conductive material, the binder and the filler used may be applied by referring to the description of the positive electrode.

The separator is interposed between the positive electrode and the negative electrode, and includes an insulating thin film with high ionic permittivity and mechanical strength. Generally, the separator has a pore diameter of 0.01~10 μm, and a thickness of 5~300 μm. The separator includes, for example, chemical-resistant and hydrophobic olefin-based polymer such as polypropylene; sheets or nonwovens made of glass fiber or polyethylene. When a solid electrolyte such as polymer is used as the electrolyte, the solid electrolyte may serve as the separator.

The lithium salt containing non-aqueous electrolyte includes a non-aqueous electrolyte solution and a lithium salt, and the non-aqueous electrolyte solution includes a non-aqueous organic solvent, an organic solid electrolyte, and an inorganic solid electrolyte.

The organic solid electrolyte includes, for example, polyethylene derivatives, polyethylene oxide derivatives, polypropylene oxide derivatives, phosphoric acid ester polymer, poly agitation lysine, polyester sulfide, polyvinyl alcohol, polyvinylidene fluoride, and polymer including ionic dissociable group.

The inorganic solid electrolyte includes, for example, nitride, halogenide, and sulphate of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$.

The lithium salt is a material that is apt to dissolve in the non-aqueous electrolyte, and includes, for example, LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lithium lower aliphatic carboxylate, lithium tetraphenylborate, and imide.

Furthermore, to improve the charging/discharging characteristics and flame retardancy, for example, pyridine, triethylphosphite, triethanolamine, cyclic ether, ethylene diamine, n-glyme, triamide hexaphosphate, nitrobenzene derivatives, sulfur, quinone imine dye, N-substituted oxazolidinone, N,N-substituted imidazolidine, ethylene glycol dialkyl ether, ammonium salts, pyrrole, 2-methoxy ethanol, and aluminum trichloride may be added to the electrolyte solution. In some cases, to give non-combustibility, a halogen containing solvent such as carbon tetrachloride and trifluoroethylene may be further included, and to improve the preservation at high temperature, carbon dioxide gas may be further included.

Advantageous Effects

As described hereinabove, the negative electrode material according to the present disclosure includes silicon flakes with hyperporous structure synthesized from low-priced clay using a metal reducing agent, leading to production cost reduction and simple production process due to the synthesis of the silicon flakes, and when a lithium secondary battery is manufactured using the same, pores with various sizes alleviate the volume expansion of silicon, and despite the micrometer size of silicon, the hyperporous structure increases the contact area with an electrolyte and reduces the movement distance of lithium ions compared to conventional bulk silicon, thereby providing an improvement effect of life characteristics and rate characteristics.

MODE FOR CARRYING OUT THE INVENTION

Figure 1:
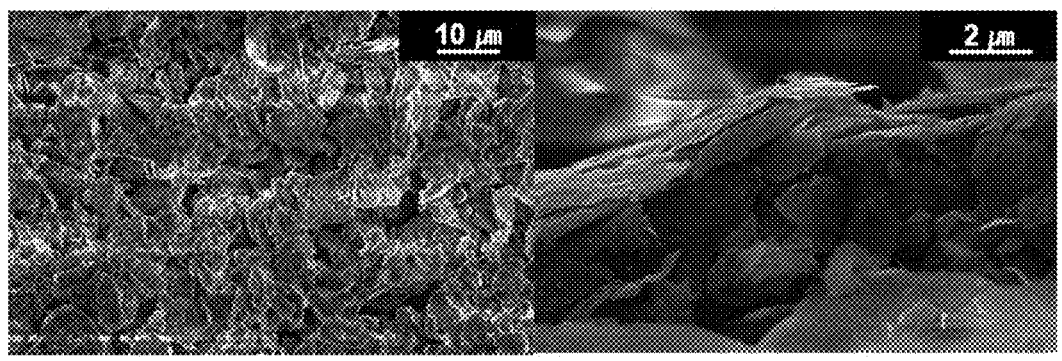
FIG. 1 is a scanning electron microscopy (SEM) image of clay (talc) used in example 1.

Hereinafter, the embodiments/examples are described to explain the present disclosure in more detail, but the following embodiments/examples are provided for illustration only, and the scope of the present disclosure is not limited thereto.

Example 1

1 g of clay (talc) was mixed with 0.7 g of magnesium while milling uniformly using a mortar. The uniformly mixed mixture was put into a reaction container, and heated in argon atmosphere at 650° C. for 3 hours to drive reduction reaction. The silicon flakes having undergone reaction were added to 200 mL of 0.5M HCL aqueous solution and mixed at 35° C. for 3 hours to remove magnesium oxide and other impurities. Removal of silica remaining after reaction was carried out by mixing silicon flakes with 0.1 to 5% of hydrofluoric acid for 5 to 30 minutes. Finally, silicon flakes with hyperporous structure were synthesized through a vacuum filter.

Example 2

Acetylene gas was introduced to silicon flakes synthesized in example 1 in 900° C. argon atmosphere for 3 minutes to drive reaction. After naturally cooling to room temperature, finally, silicon flakes coated with carbon 9 nm in thickness were synthesized.

Example 3

Silicon flakes were synthesized in the same way as example 2 except that the thickness of carbon was 5 nm.

Example 4

Silicon flakes were synthesized in the same way as example 2 except that the thickness of carbon coated was 15 nm.

Comparative Example 1

The same process was performed except the type of clay used in synthesis example of silicon flakes. That is, clay used in comparative example 1 was nanoclay.

Comparative Example 2

Silicon composite including graphene oxide was obtained in the same way as example 1 except that reaction took place with an addition of 0.05 g of carbon compound to 1 g of clay.

Comparative Example 3

50 g of bulk silicon was added to 100 mL of mixed solution of 40 mM of $CuSO_4$ with 5M HF and stirred at 50° C. for 12 hours. After reaction, porous silicon including macropores was filtered out through a filter, and remaining Cu metal was removed by stirring in 50 mL of nitric acid solution at 50° C. for 3 hours. Acetylene gas was introduced to the porous silicon in 900° C. argon atmosphere for 28 minutes to drive reaction. After naturally cooling to room temperature, finally, porous silicon coated with 15 wt % of carbon was synthesized.

Comparative Example 4

Silicon flakes were synthesized in the same way as example 1 except that the type of clay used was illite.

Comparative Example 5

Silicon flakes were synthesized in the same way as example 1 except that the reduction reaction temperature was 400° C.

Comparative Example 6

Silicon flakes were synthesized in the same way as example 1 except that the reduction reaction time was 10 minutes.

Comparative Example 7

Silicon flakes were synthesized by the same method as example 1 except that diatomite was used instead of clay (talc).

Comparative Example 8

Silicon flakes were synthesized by the same method as example 1 except that slag was used instead of clay (talc). In this instance, the used slag is also called iron slag, and its composition was CaO (43.3 wt %), $SiO_2$ (34.5 wt %), $Al_2O_3$ (13.3 wt %), MgO (3.6 wt %), $TiO_2$ (1.7 wt %), and $Fe_2O_3$ (1.1 wt %).

Experimental Example 1

Experimental Example 1-1

For evaluation of appearance, SEM image and/or TEM image of clay used in examples 1 and 2 and comparative examples 1 to 6 and silicon flakes or bulk silicon prepared using the same are shown in FIGS. 1 to 4, 7, 9 to 11, 13, 14, 16 and 17.

Figure 2:
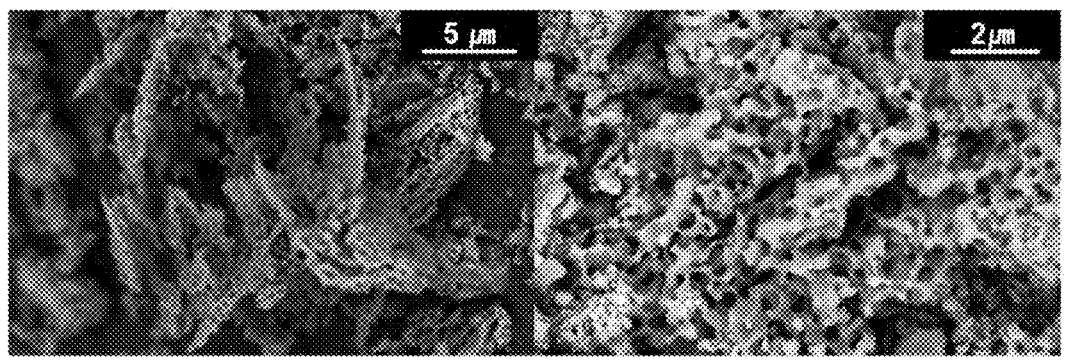
FIG. 2 is an SEM image of silicon flakes prepared in example 1.

Specifically, FIG. 1 is a scanning electron microscopy (SEM) image of clay (talc) used in example 1, and FIG. 2 is an SEM image of silicon flakes finally obtained in example 1.

Referring to FIG. 1, a layered structure of raw material, i.e., clay (talc) is found to include flakes stacked in 2 to 4 layers through covalent bond of silica and metal oxide, and when the stacked flakes are a unit structure, the thickness is 50 to 200 nm.

Referring to FIG. 2, it can be seen that silicon flakes synthesized in example 1 has a hyperporous structure.

Figure 3:
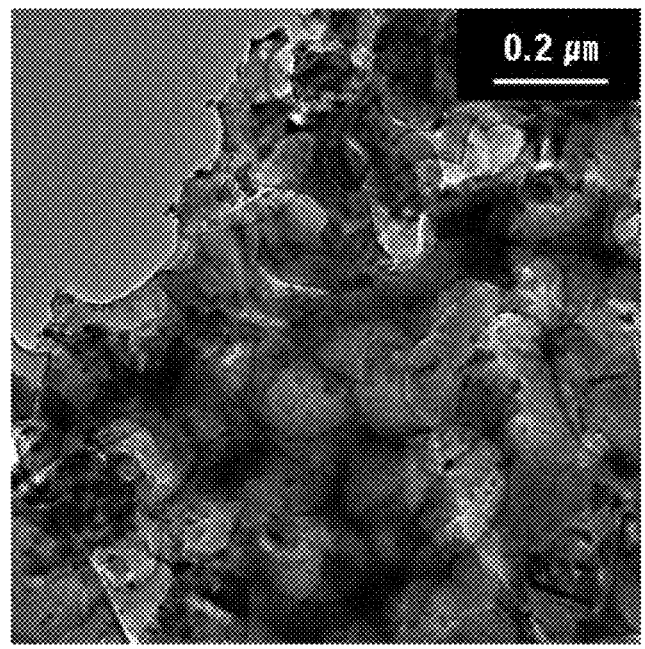
FIG. 3 is a transmission electron microscopy (TEM) image of silicon flakes prepared in example 1.

Furthermore, to understand the structure of silicon flakes finally obtained in example 1 better, a TEM image was taken and is shown in FIG. 3.

Referring to FIG. 3, it can be seen that macropores having 100 to 150 nm size are uniformly formed on the surface of silicon flakes, and silicon flakes are stacked in 2 to 4 layers.

Figure 4:
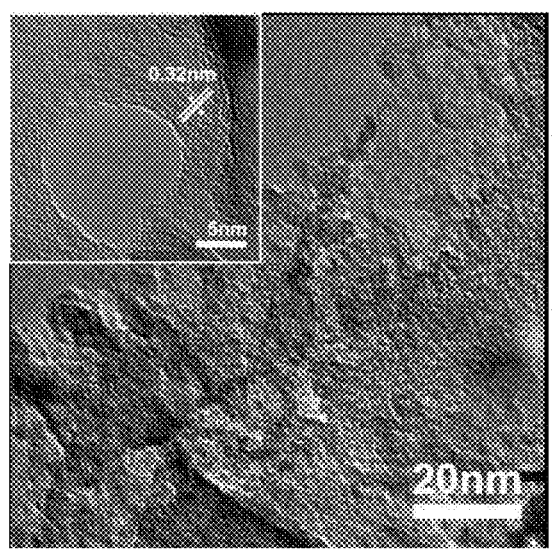
FIG. 4 is a high resolution TEM image of silicon flakes prepared in example 1.

A smaller drawing in FIG. 4 is a high resolution image of FIG. 4. Referring to FIG. 4, it can be seen that mesopores and micropores are formed on the surface of silicon flakes.

That is, analyzing FIGS. 3 and 4 together, it can be seen that silicon flakes according to example 1 have a hyperporous structure.

Figure 7:
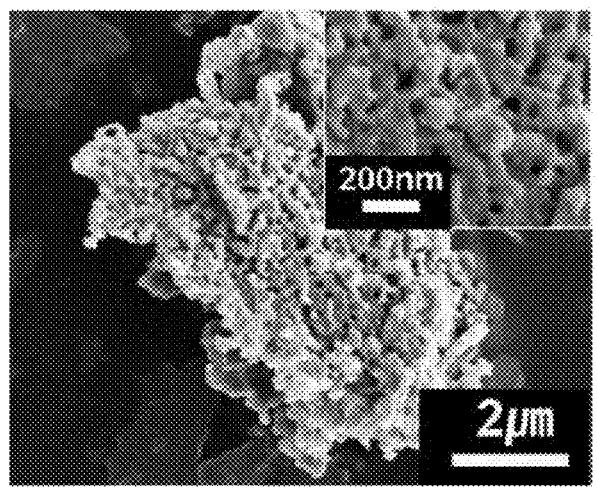
FIG. 7 is an SEM image of carbon-coated silicon flakes prepared in example 2.

Furthermore, FIG. 7 is an SEM image of carbon-coated silicon flakes prepared in example 2, and a smaller drawing in FIG. 7 is a high resolution image of FIG. 7.

Referring to FIG. 7, it can be seen that silicon flakes maintain a hyperporous structure well even after they are coated with a carbon layer.

Figure 9:
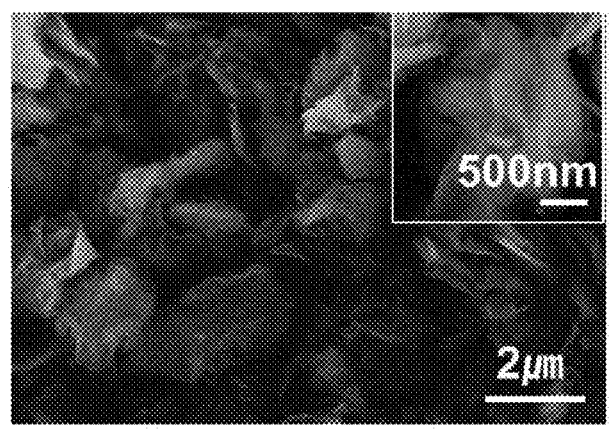
FIG. 9 is an SEM image of clay (nanoclay) used in comparative example 1.
Figure 10:
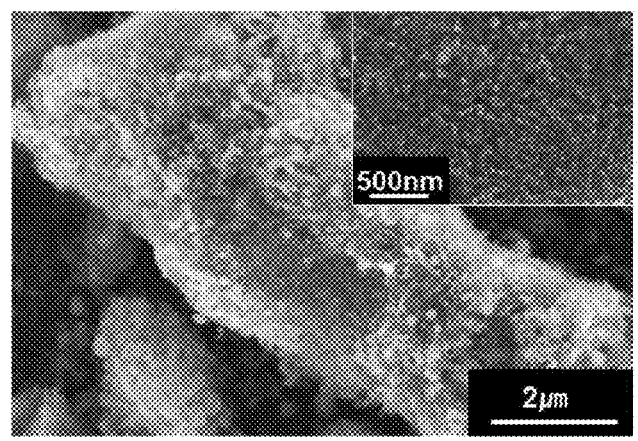
FIG. 10 is an SEM image of porous silicon prepared in comparative example 1.

Meanwhile, FIG. 9 is an SEM image of clay (nanoclay) used in comparative example 1, and FIG. 10 is an SEM image of bulk silicon finally obtained in comparative example 1.

Referring to FIG. 9, a layered structure of raw material, i.e., clay (nanoclay) is found to include nanosheets stacked through covalent bond of silica and metal oxide, and when the stacked nanosheets are a unit structure, the thickness is about 10 to 50 nm.

In contrast, referring to FIG. 10, it can be seen that silicon synthesized in comparative example 1 does not have an existing layered structure, and shows a structure of 3-dimensional (3D) bulk silicon primarily having 100 to 300 nm macropores.

In the case of nanoclay, because metal oxide (i.e., aluminum oxide) inside cannot act as a negative catalyst (heat scavenger), an excessive amount of heat generated during reduction reaction is fully transmitted to the structure, and nanoclays of small size are agglomerated. Furthermore, 100 to 300 nm macropores formed by removing MgO produced as a result of reduction are all that is formed, and accordingly, there is no hyperporous structure. For this reason, obviously, an existing layered structure or a layered structure such as silicon flakes cannot be maintained.

Figure 11:
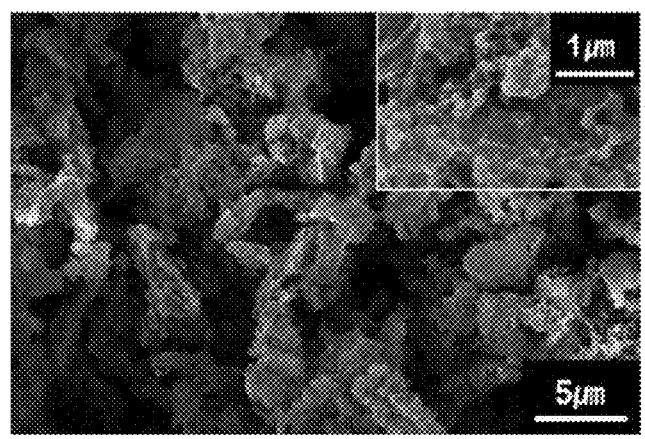
FIG. 11 is an SEM image of silicon flakes prepared with an addition of carbon compound in comparative example 2.

FIG. 11 is an SEM image of silicon flakes with added carbon compound prepared in comparative example 2, and a smaller drawing in FIG. 11 is a high resolution image of FIG. 11.

Referring to FIG. 11, in the case of silicon flakes synthesized with an addition of carbon compound, the structure of flakes is maintained on predetermined level, but during reduction reaction, the carbon compound hinders the reduction reaction, and as a result, the pore structure is not definite, and a non-uniform structure is formed.

Figure 13:
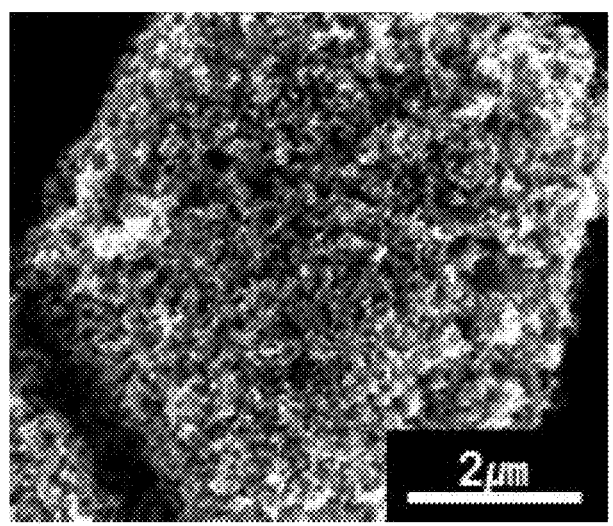
FIG. 13 is an SEM image of carbon-coated porous bulk silicon prepared in comparative example 3.

FIG. 13 is an SEM image of carbon-coated porous bulk silicon prepared in comparative example 3.

Referring to FIG. 13, a porous structure composed only of macropores is formed in bulk silicon with 3D structure, and a hyperporous structure is not found.

Figure 14:
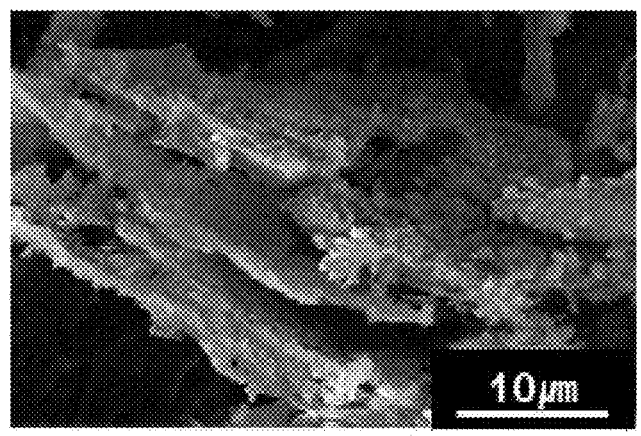
FIG. 14 is an SEM image of silicon flakes with no hyperporous structure prepared in comparative example 4.

Further, to understand the structure of silicon flakes finally obtained in comparative example 4 better, an SEM image was taken and is shown in FIG. 14.

Referring to FIG. 14, silicon prepared from raw material, i.e., clay (illite) shows a flake structure, but a hyperporous structure on the surface is absent.

Figure 15:
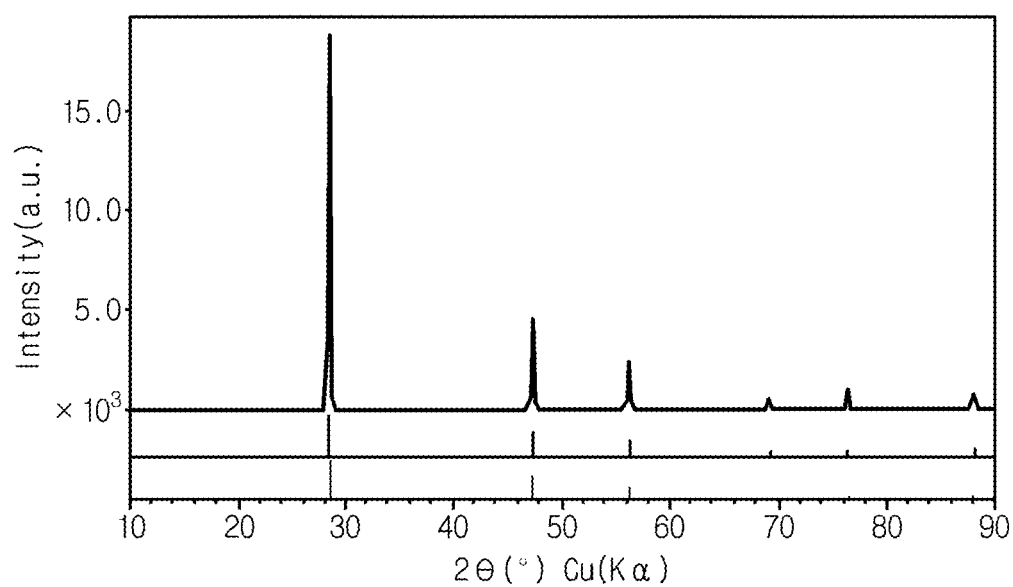
FIG. 15 is an XRD graph of silicon flakes with no hyperporous structure prepared in comparative example 4.

FIG. 15 is an X-ray diffraction (XRD) graph of silicon flakes with no hyperporous structure prepared in comparative example 4.

Figure 16:
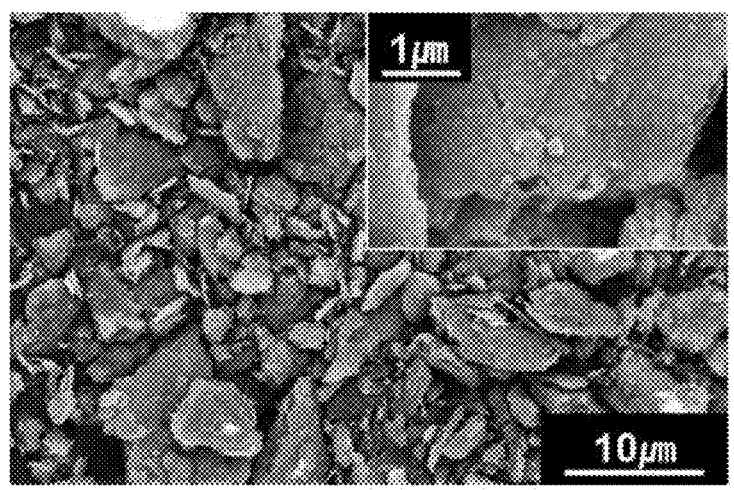
FIG. 16 is an SEM image of silicon flakes prepared in comparative example 5.

Furthermore, FIG. 16 is an SEM image of silicon flakes obtained in comparative example 5, and an inside figure in FIG. 16 is a high resolution image of FIG. 16.

Referring to FIG. 16, silicon flakes synthesized under temperature condition of 400° C. have a structure of flakes of the used clay (talc), but the pore structure is irregular and does not achieve a hyperporous structure.

A general magnesium reduction reaction is accomplished when magnesium melts around the melting point of magnesium and reacts with silica, and magnesium does not fully participate in reaction at 400° C., failing to achieve full reduction of silicon flakes, and as a consequence, a hyperporous structure is not formed.

Figure 17:
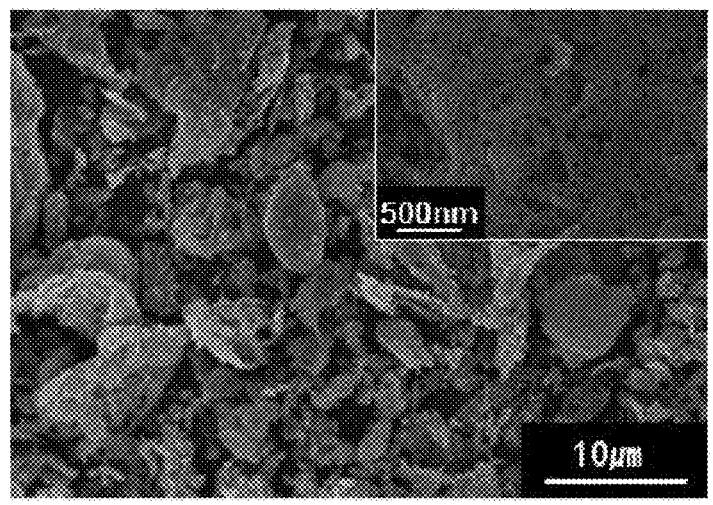
FIG. 17 is an SEM image of silicon flakes prepared in comparative example 6.

FIG. 17 is an SEM image of silicon flakes obtained in comparative example 6.

A smaller drawing in FIG. 17 is a high resolution image of FIG. 17. Referring to FIG. 17, it can be seen that macropores are not formed on the surface of silicon flakes under reaction conditions of 650° C. and 10 minutes, and a layer composed of mesopores and micropores covers the surface. When the reaction time is 10 minutes, reaction is not fully made, and silicon flakes do not perfectly form a hyperporous structure.

That is, analyzing FIGS. 16 and 17 together, the synthesis conditions including reaction temperature and reaction time applied to example 1 are found reasonable.

Experimental Example 1-2

For evaluation of appearance, SEM images of diatomite and slag used in comparative examples 7 and 8, and silicon flakes prepared using the same are shown in FIGS. 30 to 33.

Figure 30:
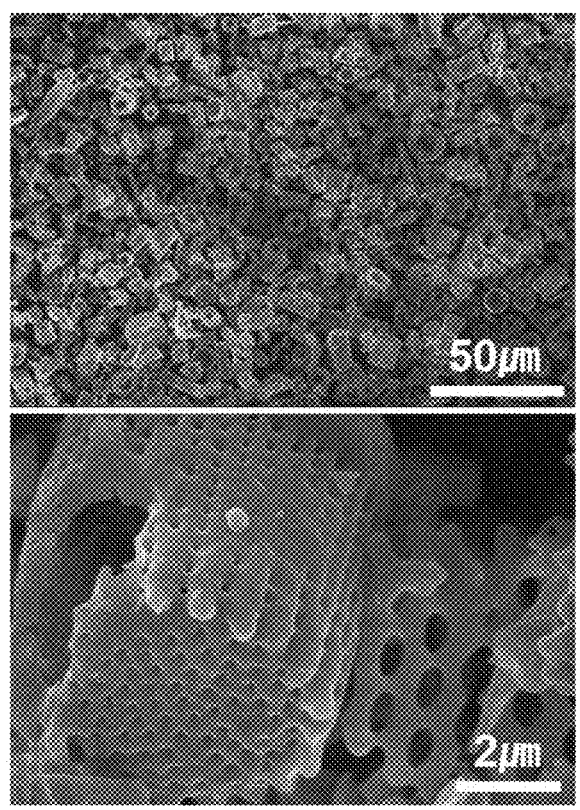
FIG. 30 is an SEM image of diatomite used in comparative example 7.
Figure 31:
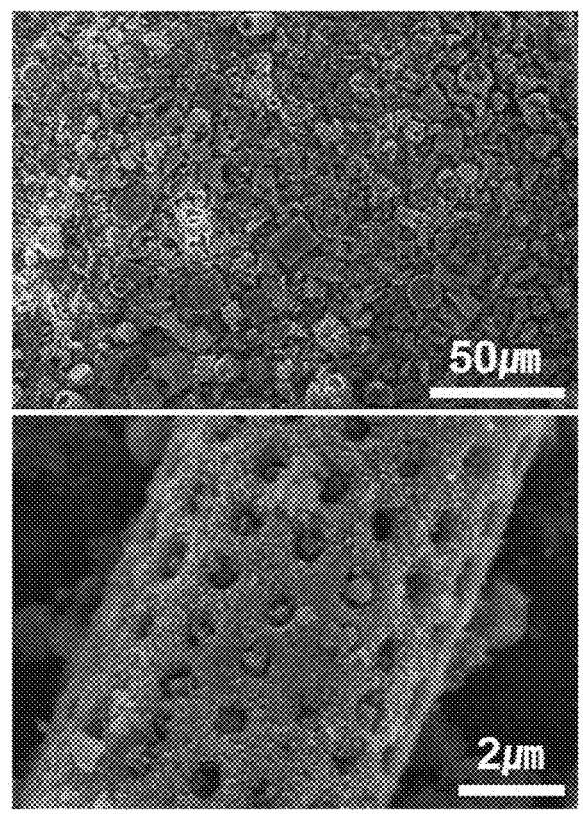
FIG. 31 is an SEM image of silicon flakes finally obtained in comparative example 7.

Specifically, FIG. 30 is an SEM image of diatomite used in comparative example 7, and FIG. 31 is an SEM image of silicon flakes finally obtained in comparative example 7.

Figure 32:
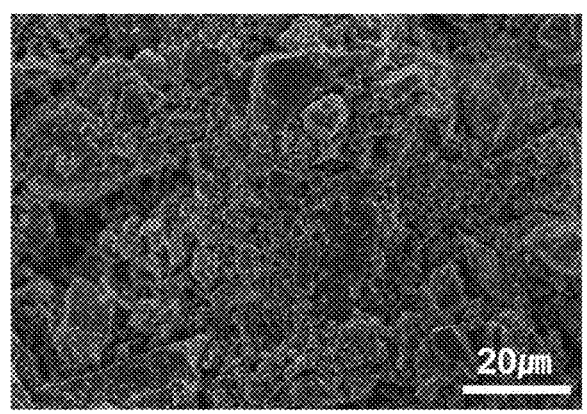
FIG. 32 is an SEM image of slag used in comparative example 8.
Figure 33:
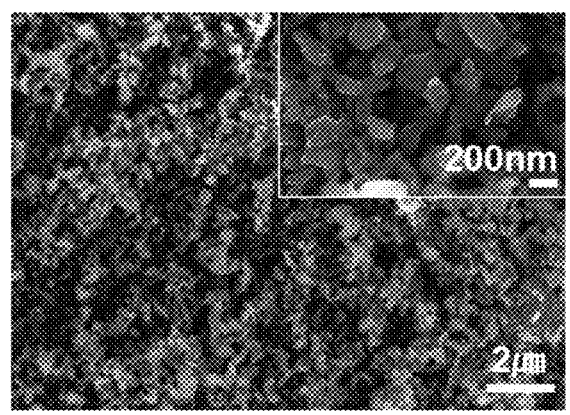
FIG. 33 is an SEM image of silicon flakes finally obtained in comparative example 8.

Furthermore, FIG. 32 is an SEM image of slag used in comparative example 8, and FIG. 33 is an SEM image of silicon flakes finally obtained in comparative example 8.

For silicon flakes prepared using talc for clay, compared to FIG. 2 in which porous silicon of 2D structure was synthesized, in comparative example 7, porous silicon of 3D structure was synthesized, and in comparative example 8, mesoporous silicon particles having 500 nm size were synthesized and a hyperporous structure was not formed.

Experimental Example 2

Figure 6:
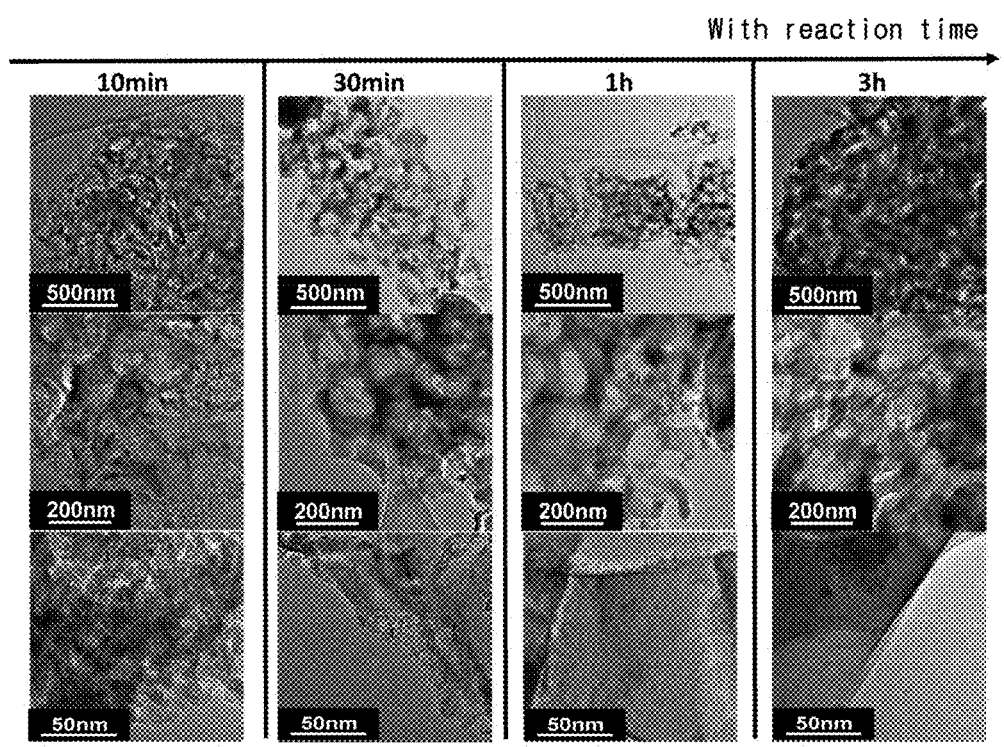
FIG. 6 is a TEM image showing a pore formation process of silicon flakes prepared in example 1 as a function of reaction time.

To understand the pore structure formation process of silicon flakes finally obtained in example 1 as a function of reaction time better, a TEM image was taken and is shown in FIG. 6.

Referring to FIG. 6, when the reaction time is 10 minutes, macropores structure of the silicon flakes was hardly observed, and the entire surface was composed of mesopores. It can be also seen that the thickness is more than the level of clay. Additionally, it can be seen that crystallinity of silicon reduces.

When the reaction time is 30 minutes, macropores structure starts to form, and due to reaction heat, a layer of silicon flakes delaminated from the stack structure of clay is formed.

Furthermore, it can be seen that 50 to 70% of the surface of silicon flakes is composed of mesopores, and crystallinity increases.

When the reaction time is 1 hour, macropores have a more uniform size, and judging from the observation of overlapping macropores, it can be seen that delaminated silicon flakes start to be stacked in 2 to 3 layers.

Furthermore, it can be seen that 10 to 30% of the surface of silicon flakes is composed of mesopores, and crystallinity increases.

When the reaction time is 3 hours, macropores have slightly smaller size, and a stack of 3 to 4 layers is observed.

Furthermore, the mesoporous structure on the surface of silicon flakes disappears, and a frame of dense structure is observed.

In conclusion, analyzing the TEM image of FIG. 6 together, an excessive amount of mesopores are formed on the surface by a metal reducing agent at the initial time of reaction, and as the time passes, the reaction proceeds into the clay, making delamination and macropores structure more clear, and when the reaction time is longer than 30 minutes, stacks are observed again, and the macropore size reduces. Accordingly, the reaction time of at least 30 minutes is required to obtain the silicon flakes according to the present disclosure, and specifically, the most preferred reaction time is 1 hour to 3 hours.

Figure 37:
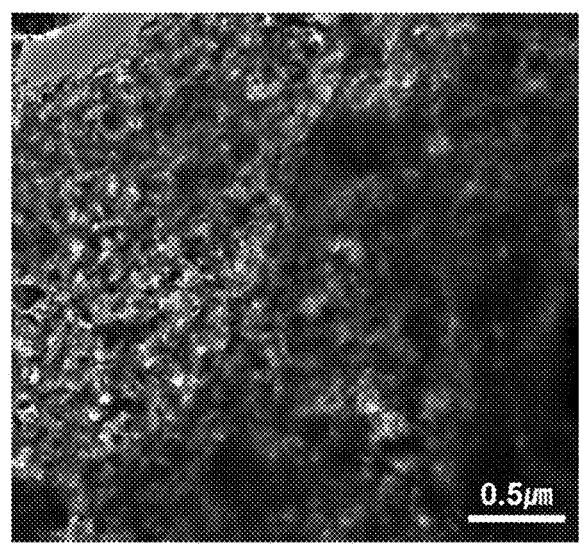
FIG. 37 is a TEM image of silicon flakes having undergone thermal treatment reaction of 650° C. for 6 hours.

FIG. 37 is a TEM image of silicon flakes having undergone thermal treatment reaction at 650° C. for 6 hours. Referring to FIG. 37, it can be seen that as the thermal treatment time increases, all the particles increase in size. This is thought to be aggregation typically appearing when subjected to reaction at high temperature for a long time, and one more point to note is a size reduction of macropores to very small size and consequential indefinite boundary as described previously. It may be caused by agglomeration of many layers of silicon flakes.

Experimental Example 3

To understand the structure of silicon flakes finally obtained in examples 1 and 2 and comparative examples 2 and 4 better, XRD graphs were plotted and are shown in FIGS. 5, 8, 12, and 15.

The XRD equipment (D8 Advance, Bruker) was used to measure at 3 kW X-ray power, 20 kV measurement voltage, 50 mA measurement current, and the measurement range between 10 and 90 degrees.

Figure 5:
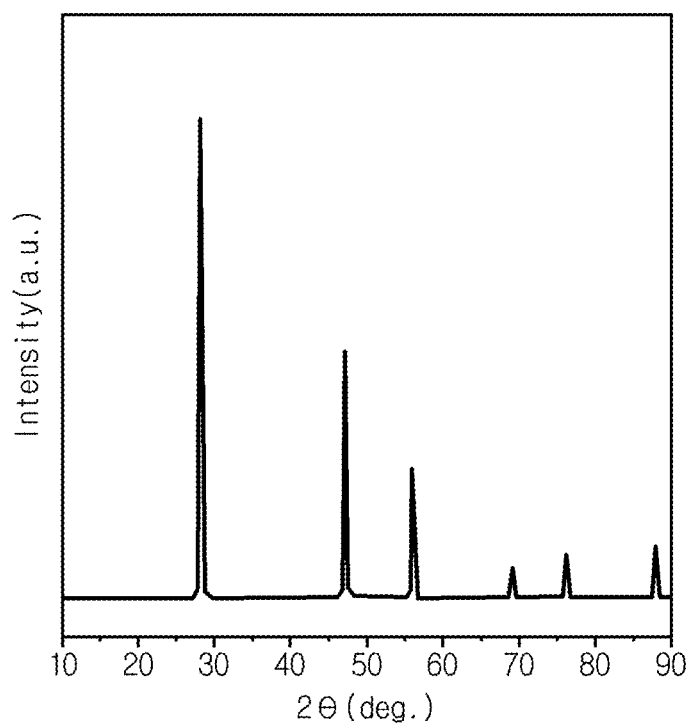
FIG. 5 is an X-ray diffraction (XRD) graph of silicon flakes prepared in example 1.
Figure 8:
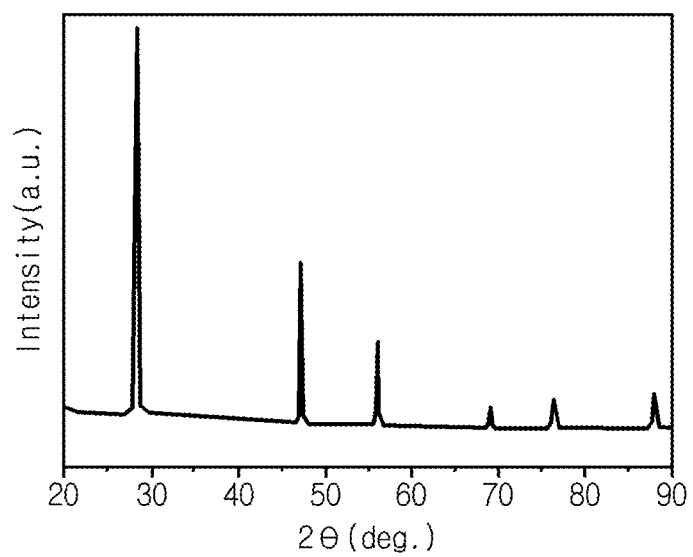
FIG. 8 is an XRD graph of carbon-coated silicon flakes prepared in example 2.
Figure 12:
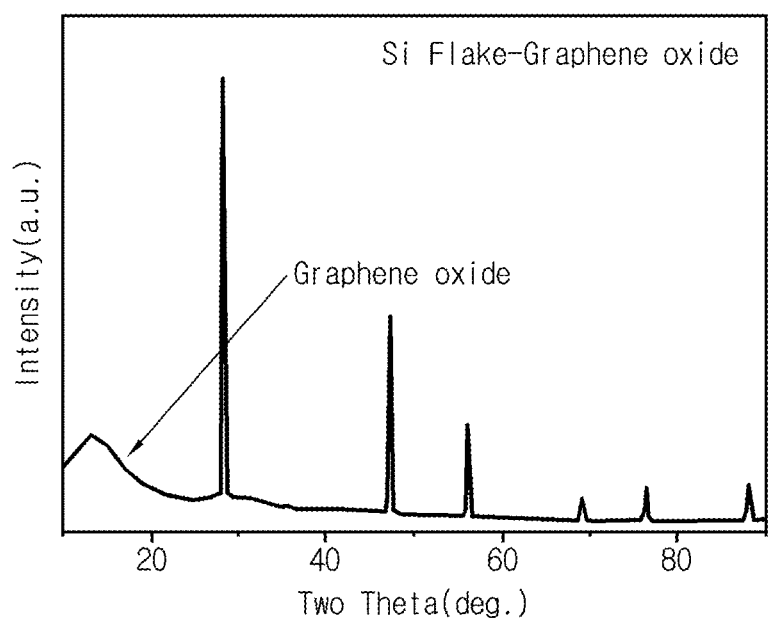
FIG. 12 is an XRD graph of silicon flakes prepared with an addition of carbon compound in comparative example 2.

Referring to FIGS. 5, 8 and 12, it can be seen that pure silicon is synthesized without impurities.

Referring to FIG. 8, a thin carbon layer is coated, but it is too small to be observed through XRD analysis, and referring to FIG. 12, it can be seen that silicon and graphene oxide exist together.

Experimental Example 4

Experimental Example 4-1

Various silicon prepared in example 1 and comparative examples 1 to 4 was used as a negative electrode active material, polyacrylic acid (PAA)/CMC was used as a binder and carbon black was used as a conductive material. The negative electrode active material:binder:conductive material were mixed well in water at a weight ratio of 8:1:1, applied to a 18 μm thick Cu foil and dried at 150° C. to manufacture a negative electrode. For a positive electrode, a lithium foil was used, and a half coin cell was manufactured using an electrolyte solution containing 1M $LiPF_6$ and 10 wt % of fluoroethylene carbonate (FEC) in a solvent of ethylene carbonate (EC):diethyl carbonate (DEC)=3:7.

For the manufactured half coin cell, charge/discharge capacity was measured at 25° C. with 0.05 C current and voltage ranging from 0.01 to 1.2 V, and discharge capacity and charge/discharge efficiency results are shown in FIGS. 18 to 22.

Figure 18:
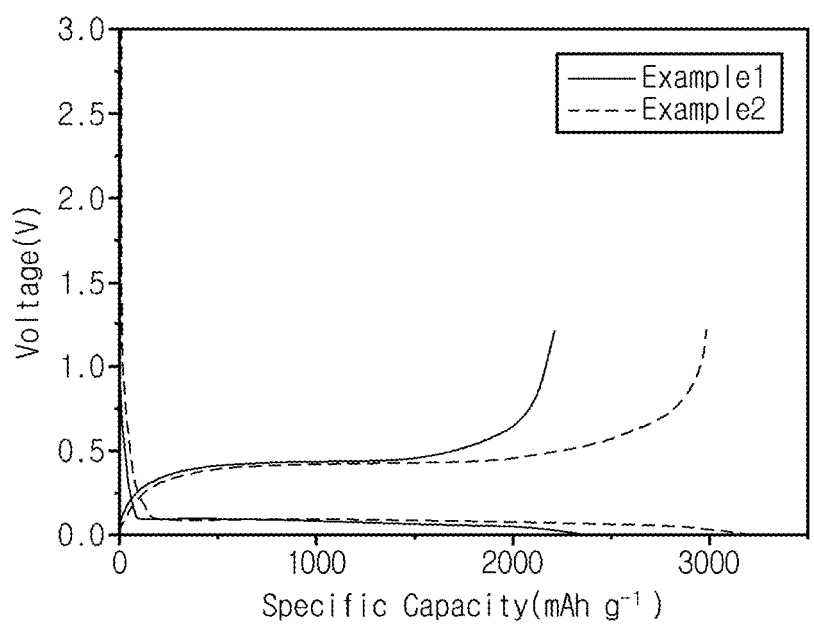
FIG. 18 is an initial charge/discharge graph of coin cell fabricated in experimental example 4 using silicon flakes of example 1 and example 2 as an active material.

Referring to FIG. 18, the half coin cells manufactured using silicon flakes and carbon-coated silicon flakes have the specific charge/discharge capacity of 2209/2383 and 2984/3216, and the initial charge/discharge efficiency of 92.67% and 92.77% respectively.

Figure 19:
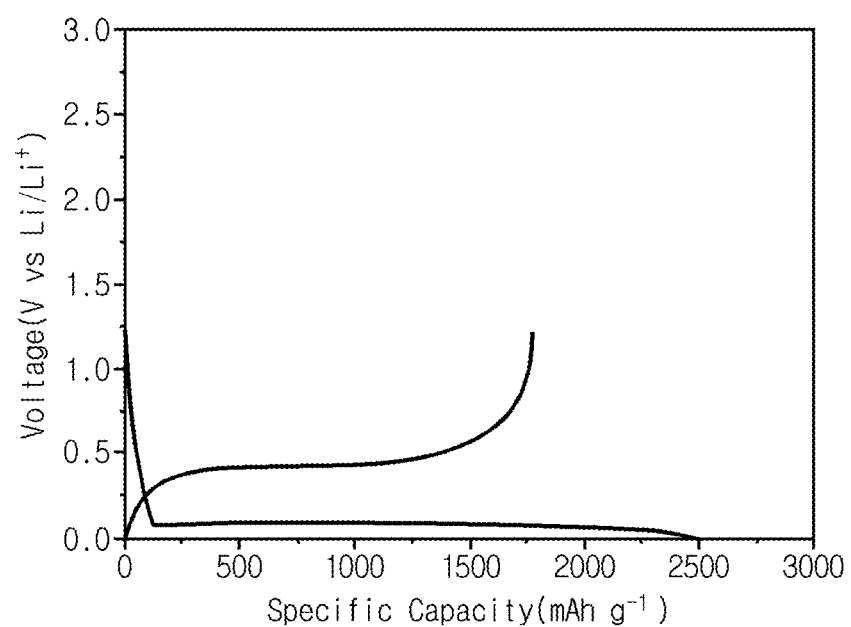
FIG. 19 is an initial charge/discharge graph of coin cell fabricated in experimental example 4 using bulk silicon of comparative example 1 as an active material.

In contrast, referring to FIG. 19, the half coin cell manufactured using bulk silicon prepared from nanoclay has the specific charge/discharge capacity of 1772/2497, and the initial charge/discharge efficiency of 70.96%.

Figure 20:
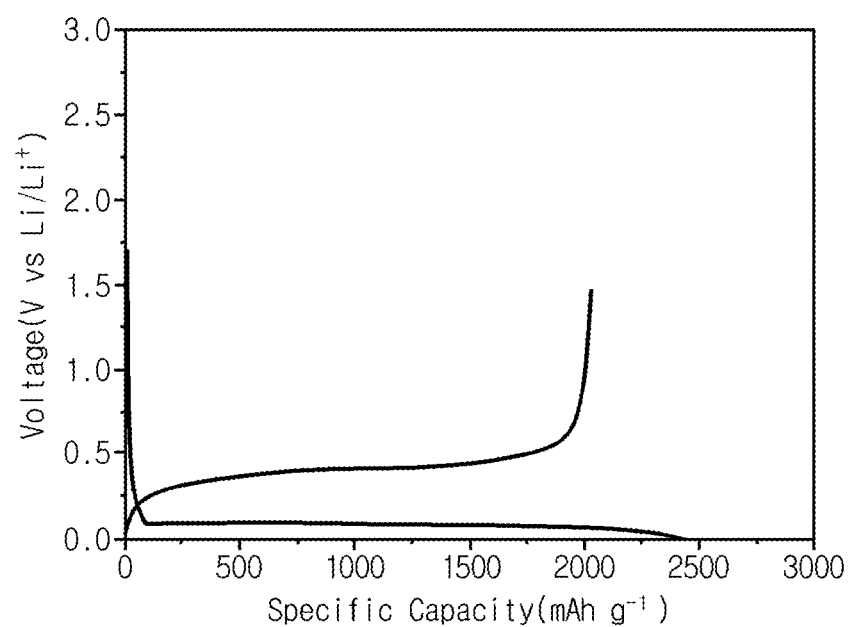
FIG. 20 is an initial charge/discharge graph of coin cell fabricated in experimental example 4 using silicon flakes with added carbon compound of comparative example 2 as an active material.

Referring to FIG. 20, the half coin cell manufactured using silicon flakes with added carbon compound had the specific charge/discharge capacity of 2027/2475, and the initial charge/discharge efficiency of 81.9%.

Figure 21:
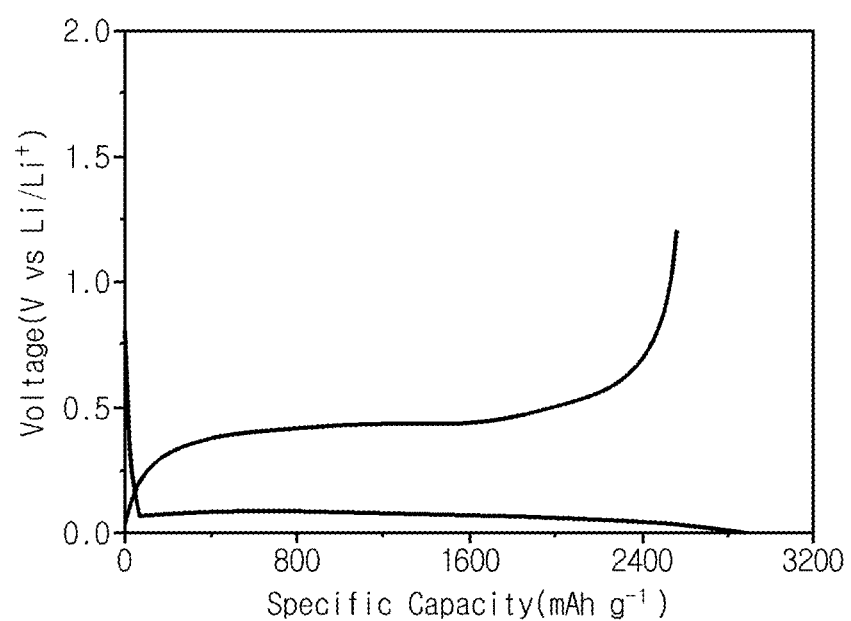
FIG. 21 is an initial charge/discharge graph of coin cell fabricated in experimental example 4 using carbon-coated porous bulk silicon of comparative example 3 as an active material.

Referring to FIG. 21, the half coin cell manufactured using carbon-coated porous silicon prepared through a metal-assisted chemical etching method has the specific charge/discharge capacity of 2565/2886, and the initial charge/discharge efficiency of 88.88%.

Figure 22:
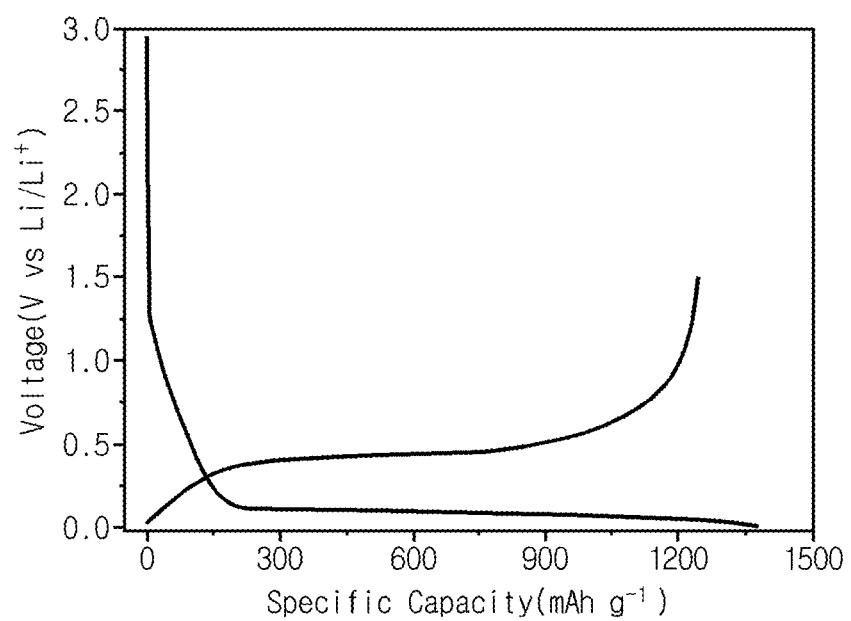
FIG. 22 is an initial charge/discharge graph of coin cell fabricated in experimental example 4 using silicon flakes with no hyperporous structure of comparative example 4 as an active material.

Referring to FIG. 22, the half coin cell manufactured using silicon flakes with no hyperporous structure has the specific charge/discharge capacity of 1243/1381, and the initial charge/discharge efficiency of 90.05%.

Experimental Example 4-2

Various silicon prepared in example 1, example 2, comparative example 7 and comparative example 8 was used as a negative electrode active material, polyacrylic acid (PAA)/CMC was used as a binder, and carbon black was used as a conductive material. The negative electrode active material:binder:conductive material were mixed well in water at a weight ratio of 8:1:1, applied to a 18 μm thick Cu foil and dried at 150° C. to manufacture a negative electrode. For a positive electrode, a lithium foil was used, and a half coin cell was manufactured using an electrolyte solution containing 1M $LiPF_6$ and 10 wt % of fluoroethylene carbonate (FEC) in a solvent of ethylene carbonate (EC):diethyl carbonate (DEC)=3:7.

Figure 34:
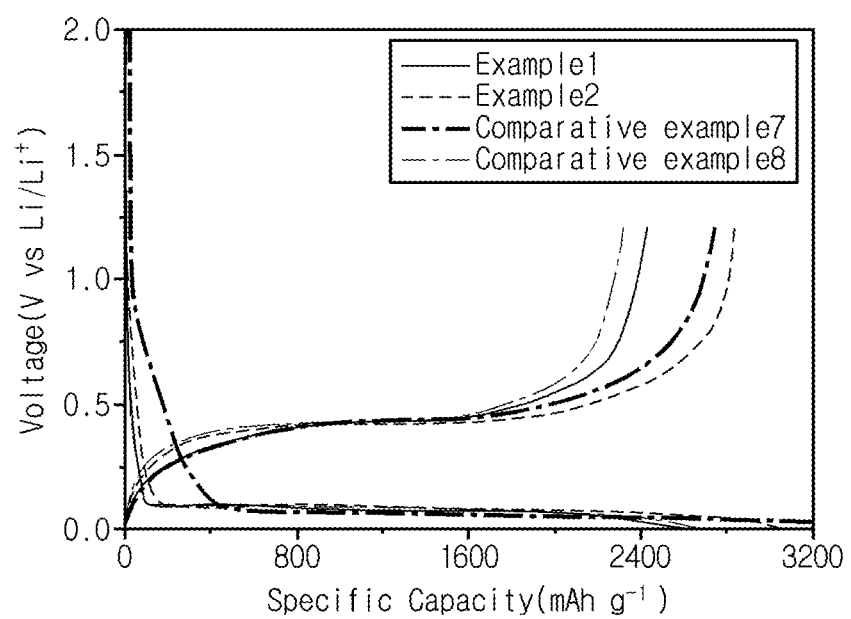
FIG. 34 is an initial charge/discharge graph of coin cell fabricated in experimental example 4 using each silicon material of example 1, example 2, comparative example 7, and comparative example 8 as an active material.

For the manufactured half coin cell, charge/discharge capacity was measured at 25° C. with 0.05 C current and voltage ranging from 0.01 to 1.2 V, and discharge capacity and charge/discharge efficiency results are shown in FIG. 34.

Referring to FIG. 34, the half coin cells manufactured using silicon flakes (example 1) and carbon-coated silicon flakes (example 2) have the specific charge/discharge capacity of 2209/2383 and 2984/3216, and the initial charge/discharge efficiency of 92.67% and 92.77%.

In contrast, in the case of silicon synthesized from diatomite and slag (comparative example 7 and comparative example 8), the charge/discharge specific capacity was 2742/3483 and 2320/2674, and the initial charge/discharge efficiency was 78.77% and 86.76, respectively.

In conclusion, when silicon flakes according to the present disclosure are used as an active material, the initial charge/discharge efficiency is considerably high compared to the case using bulk silicon and silicon flakes with no hyperporous structure, and further, it can be seen that they have higher initial charge/discharge efficiency than silicon flakes including carbon compound and carbon-coated porous silicon.

Experimental Example 5

Experimental Example 5-1

The carbon-coated silicon prepared in examples 3 and 4 was used as a negative electrode active material, PAA/CMC was used as a binder, and carbon black was used as a conductive material. The negative electrode active material:binder:conductive material were mixed well in water at a weight ratio of 8:1:1, applied to a 18 μm thick Cu foil, and dried at 150° C. to manufacture a negative electrode. For a positive electrode, a lithium foil was used, and a half coin cell was manufactured using an electrolyte solution containing 1M $LiPF_6$ and 10 wt % of FEC in a solvent of EC:DEC=3:7.

Using the half coin cells manufactured as above and half coin cells manufactured in experimental example 4, life characteristics were evaluated at 0.2 C (1 C=3 A/g) current in 100 charge/discharge cycles, and the results are shown in FIGS. 23 to 28.

Figure 23:
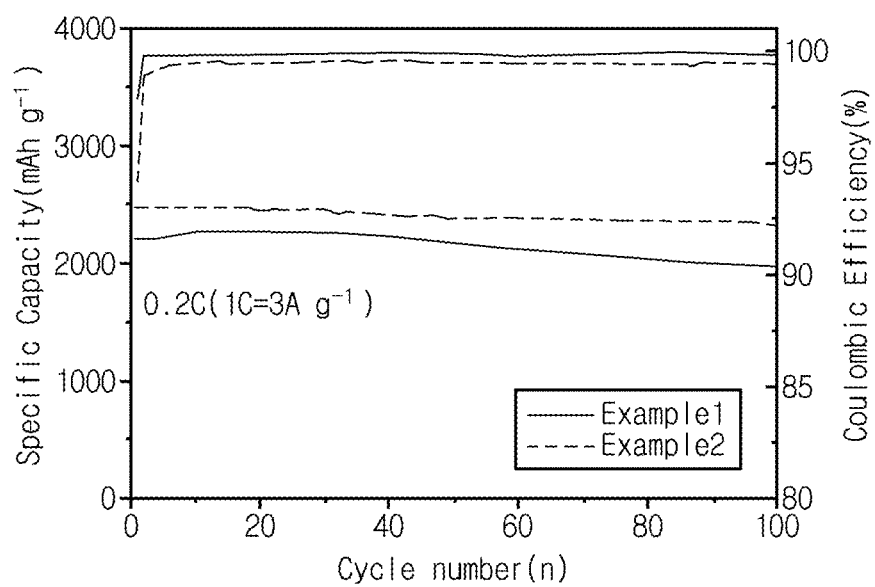
FIG. 23 is a graph showing charge/discharge life characteristics of coin cell fabricated in experimental example 5 using silicon flakes of example 1 and example 2 as an active material.

Referring to FIG. 23, the half coin cells manufactured using silicon flakes (example 1) and carbon-coated silicon flakes (example 2) as an active material have the cycle life of 89.0% and 94.6% in 100 charge/discharge cycles at the rate of 0.2 C respectively.

Figure 24:
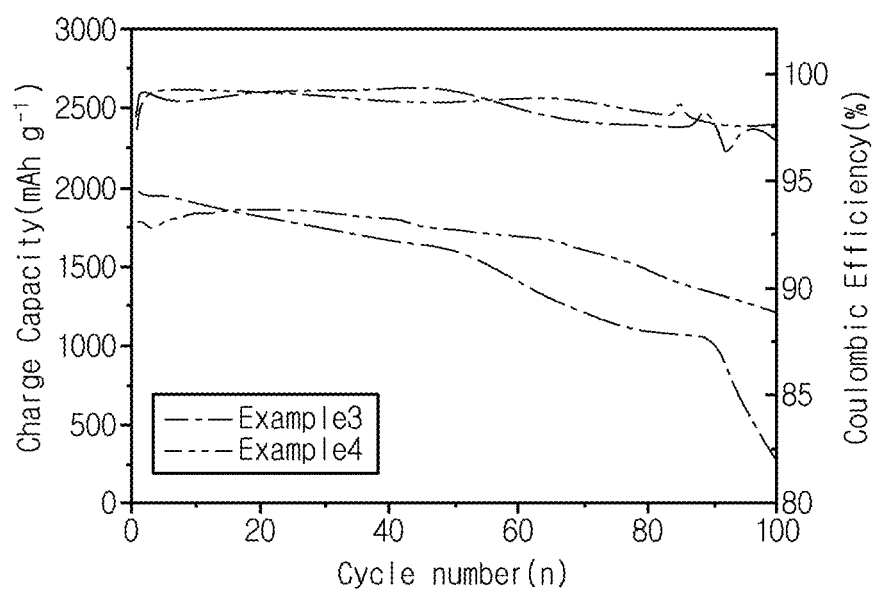
FIG. 24 is a graph showing charge/discharge life characteristics of coin cell fabricated in experimental example 5 using silicon flakes coated with carbon at different thicknesses of examples 3 and 4 as an active material.

Referring to FIG. 24, life characteristics of the half coin cells manufactured using silicon flakes of examples 3 and 4 as an active material were evaluated in 100 charge/discharge cycles at the rate of 0.2 C. They have sufficiently good life characteristics compared to comparative examples.

Figure 25:
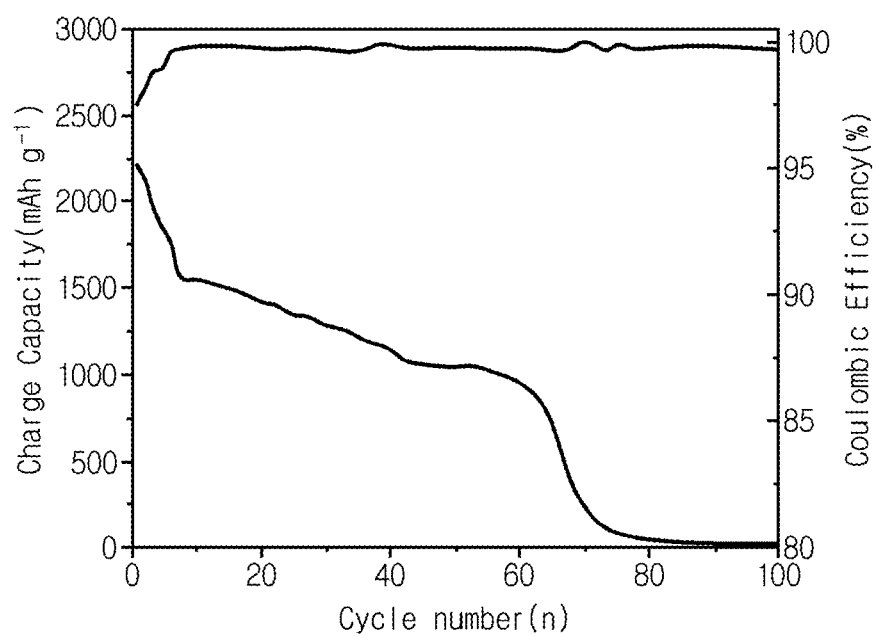
FIG. 25 is a graph showing charge/discharge life characteristics of coin cell fabricated in experimental example 5 using bulk silicon of comparative example 1 as an active material.

Referring to FIG. 25, the life of the half coin cell using bulk silicon of comparative example 1 as an active material expired in 100 charge/discharge cycles at the rate of 0.2 C.

Figure 26:
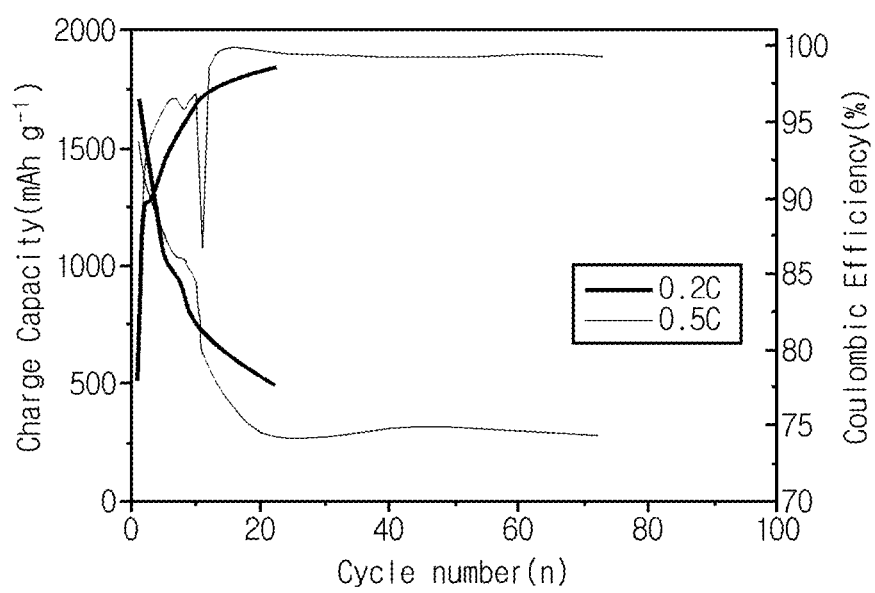
FIG. 26 is a graph showing charge/discharge life characteristics of coin cell fabricated in experimental example 5 using silicon flakes with added carbon compound of comparative example 2 as an active material.

Referring to FIG. 26, the half coin cell manufactured using silicon flakes with added carbon compound has a rapid reduction in charge/discharge cycles at the rate of 0.2 C, and has the cycle life of only 18.3% in 70 charge/discharge cycles at the rate of 0.5 C.

Figure 27:
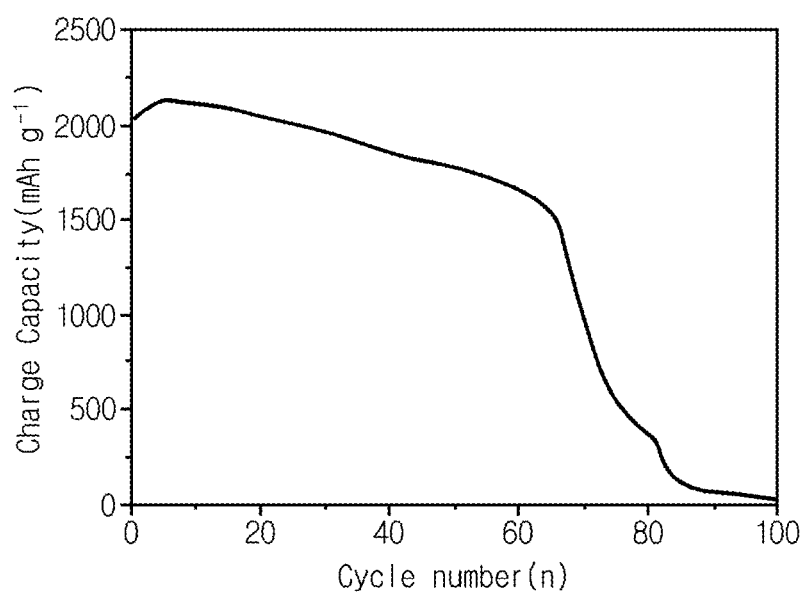
FIG. 27 is a graph showing charge/discharge life characteristics of coin cell fabricated in experimental example 5 using carbon-coated porous bulk silicon of comparative example 3 as an active material.

Referring to FIG. 27, the life of the half coin cell manufactured using carbon-coated porous silicon expired in 100 charge/discharge cycles at the rate of 0.2 C.

Figure 28:
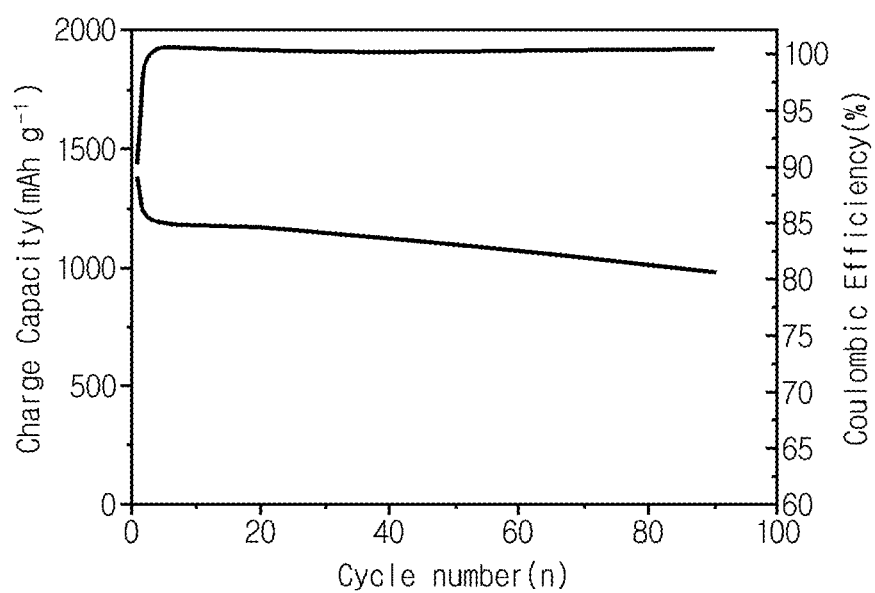
FIG. 28 is a graph showing charge/discharge life characteristics of coin cell fabricated in experimental example 5 using silicon flakes with no hyperporous structure of comparative example 4 as an active material.

Referring to FIG. 28, the half coin cell manufactured using silicon flakes with no hyperporous structure has the cycle life of 71.74% in 90 charge/discharge cycles at the rate of 0.2 C.

Experimental Example 5-2

Various silicon prepared in example 1, example 2, comparative example 7, and comparative example 8 was used as a negative electrode active material, PAA/CMC was used as a binder, and carbon black was used as a conductive material. The negative electrode active material:binder:conductive material were mixed well in water at a weight ratio of 8:1:1, applied to a 18 μm thick Cu foil, and dried at 150° C. to manufacture a negative electrode. For a positive electrode a lithium foil was used, and a half coin cell was used using an electrolyte solution containing 1M $LiPF_6$ and 10 wt % of FEC in a solvent of EC:DEC=3:7.

Figure 35:
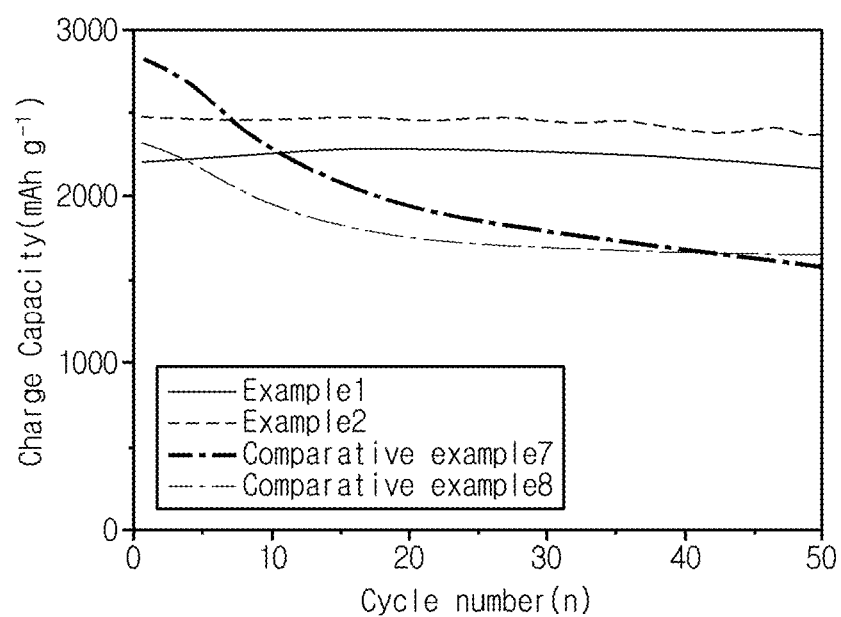
FIG. 35 is a graph showing charge/discharge life characteristics of coin cell fabricated in experimental example 5 using silicon material of example 1, example 2, comparative example 7, and comparative example 8 as an active material.

Using the manufactured half coin cells, life characteristics were evaluated at 0.2 C (1 C=3 A/g) current in 50 charge/discharge cycles, and the results are shown in FIG. 35.

Referring to FIG. 35, the half coin cells manufactured using silicon flakes (example 1) and carbon-coated silicon flakes (example 2) show cycle characteristics of 100% and 95.97% in 50 charge/discharge cycles at 0.2 C rate, respectively. In contrast, silicon synthesized from diatomite and Ferro-Si (comparative example 7 and comparative example 9) showed life characteristics of 56.47% and 71.36% respectively.

In conclusion, when the silicon flakes according to the present disclosure are used as an active material, the cycle life was longer than the case using bulk silicon and silicon flakes with no hyperporous structure, and further, in the case of using carbon-coated silicon flakes, there is an effect on significantly improving the life characteristics compared to silicon flakes with added carbon compound.

Experimental Example 6

Figure 29:
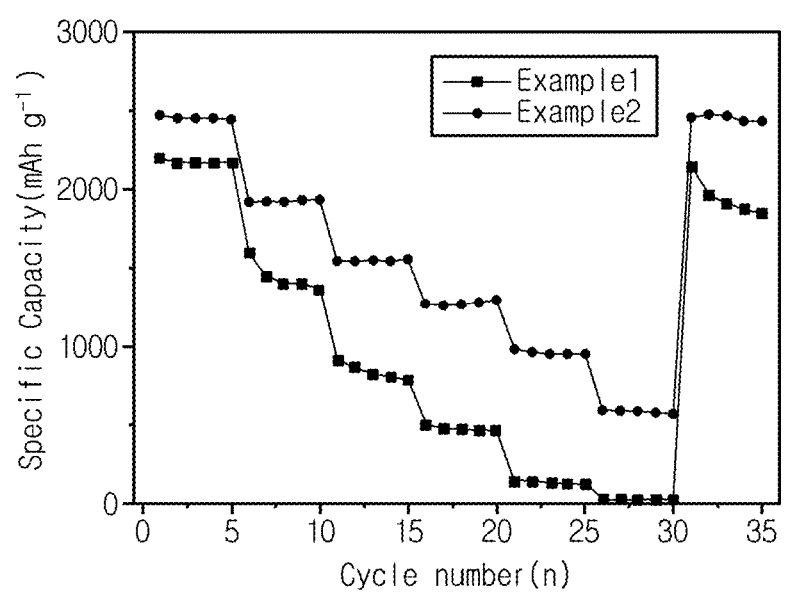
FIG. 29 is a graph showing charge/discharge characteristics as a function of C-rate for coin cell fabricated in experimental example 6 using silicon flakes of example 1 and example 2 as an active material.

According to experimental example 4, with half coin cells using silicon flakes prepared in example 1 and example 2 as a negative electrode active material, rate characteristics were evaluated under the charge/discharge condition with the current of 0.2 C, 0.5 C, 1 C, 2 C, 5 C, 10 C and its results are shown in FIG. 29.

Referring to FIG. 29, the half coin cells manufactured using silicon flakes (example 1) and carbon-coated silicon flakes (example 2) have the specific capacity of about 25 and 585 at 10 C rate.

Figure 36:
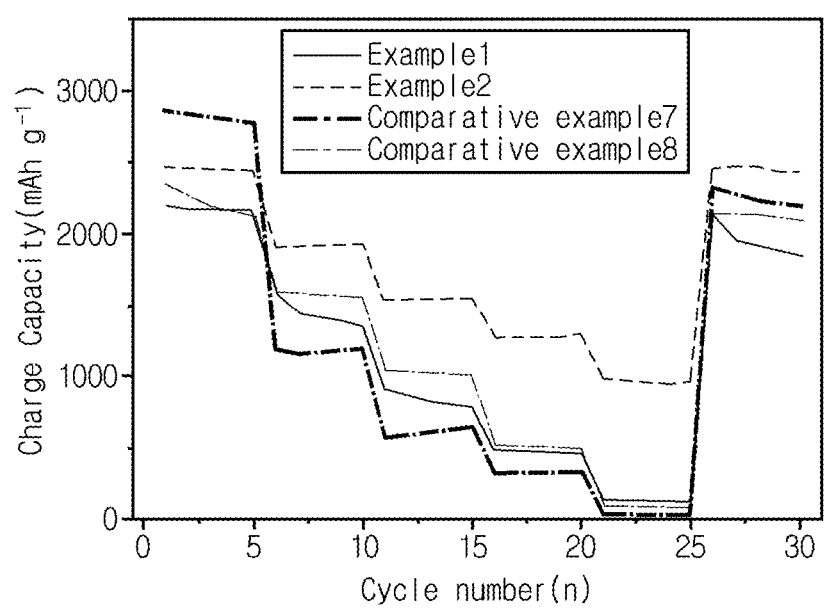
FIG. 36 is a graph showing charge/discharge characteristics as a function of C-rate for coin cell fabricated in experimental example 6 using silicon material of example 1, example 2, comparative example 7, and comparative example 8 as an active material.

Furthermore, according to experimental example 4, with half coin cells using silicon flakes prepared in example 1, example 2, comparative example 7 and comparative example 8 as a negative electrode active material, rate characteristics were evaluated under the charge/discharge condition with the current of 0.2 C, 0.5 C, 1 C, 2 C, 5 C, and its results are shown in FIG. 36.

Referring to FIG. 36, when silicon flakes of example 1 and carbon-coated silicon flakes of example 2 are used as a negative electrode active material, each specific capacity at 5 C is 134 and 958, and when each silicon synthesized from diatomite of comparative example 7 and Ferro-Si of comparative example 8 is used, each specific capacity is 28 and 87 (unit of specific capacity: $mAhg^{-1}$).

In conclusion, when the silicon flakes according to the present disclosure are used as an active material, the performance is also good in terms of rate characteristics, but when carbon-coated silicon flakes are used, it is much better in terms of rate characteristics.

Through the electrochemical analysis, it can be seen that silicon flakes and carbon-coated silicon flakes according to an embodiment of the present disclosure have better initial efficiency, life characteristics, and rate characteristics than other silicon materials synthesized through Mg reduction.

The reason for the performance improvement can be explained as below.

First, the silicon flakes according to an embodiment of the present disclosure can have greatly improved electrolyte solution impregnation characteristics through the hyperporous structure. Most of the porous silicon structures have pores on the surface only, while the silicon flakes according to an embodiment of the present disclosure have large macropores over the entire structure, bringing an electrolyte solution and an electrode material into uniform contact from the initial cycle, which helps improve the diffusion of lithium ions.

Second, the silicon flakes according to an embodiment of the present disclosure have various types of pores including macropores as well as mesopores and micropores, which is advantageous in terms of accommodating the volume expansion. According to earlier studies, volume expansion was reduced through porous structure, and 3D porous structure was proposed. Completely different from the earlier technology, the silicon flakes according to an embodiment of the present disclosure are applied as a silicon negative electrode active material with 2D porous structure.

In addition, the silicon flakes according to an embodiment of the present disclosure exhibits superior reversible capacity at a high C rate despite a large particle size, which greatly improves electrolyte solution impregnation characteristics through the hyperporous structure, helping improve the diffusion of lithium ions, and thus it is advantageous in terms of accommodating the volume expansion. The reason why a material with 2D structure is more advantageous in volume expansion than 3D structure is that even under the same volume expansion, a material with 2D structure can maintain the structure better and a material with 3D structure changes the structure to 2D structure in many cycles. 2D structure expands in surface direction and vertical direction, and even though the same volume expansion is taken into account, an expansion rate in a real electrode is much smaller, so it is superior to the material of 3D structure expanding in all directions.

Figure 38:
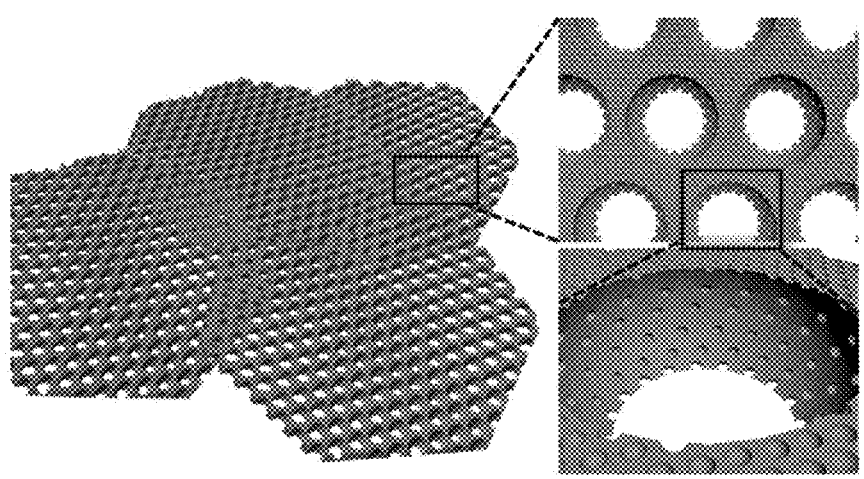
FIG. 38 is a diagram of silicon flakes with hyperporous structure according to an embodiment of the present disclosure.

FIG. 38 is a diagram of silicon flakes with hyperporous structure according to an embodiment of the present disclosure. Referring to FIG. 38, the largest and round part is macropore, and pores disposed on the surface thereof are mesopore and micropore. That is, mesopores and micropores are formed on the frame surface of silicon flakes, and macropores are holes created inside of the silicon flakes frame, that is, in the frame itself.

While the present disclosure has been hereinabove described with regard to a limited number of embodiments and drawings, the present disclosure is not limited thereto and it is obvious that various modification and alteration may be made thereto by person having ordinary skill in the technical field pertaining to the present disclosure within the technical aspect of the present disclosure and the equivalent scope to which the appended claims are entitled.

What is claimed is:

1. A negative electrode material comprising, as an active material, silicon flakes with a hyperporous structure, represented by the following chemical formula 1:

$$x\text{Si.}(1-x)\text{A} \qquad (1)$$

where $0.5 \leq x \leq 1.0$, and

A is an impurity, and includes at least one compound selected from the group consisting of $Al_2O_3$, MgO, $SiO_2$, $GeO_2$, $Fe_2O_3$, CaO, $TiO_2$, $Na_2O$, $K_2O$, CuO, ZnO, NiO, $Zr_2O_3$, $Cr_2O_3$ and BaO, wherein the silicon flakes have a BET surface area of 120 $m^2/g$ to 250 $m^2/g$, wherein the silicon flakes have a hyperporous structure including macropores having a pore size in the range of greater than 50 nm to 500 nm, mesopores having a pore size of greater than 2 nm to 50 nm, and micropores having a pore size of 0.5 nm to 2 nm, wherein mesopores and micropores are formed on a frame surface of the silicon flakes, and macropores are through holes created inside of the silicon flakes frame.

2. The negative electrode material according to claim 1, wherein the silicon flakes have an average pore diameter of 100 nm to 150 nm.

3. The negative electrode material according to claim 1, wherein the silicon flakes have a porosity of 100 to 5000 based on a total volume.

4. The negative electrode material according to claim 1, wherein the silicon flakes have a thickness of 20 to 100 nm.

5. The negative electrode material according to claim 1, wherein the silicon flakes have a size of 200 nm to 50 μm.

6. The negative electrode material according to claim 1, wherein the silicon flakes further include carbon coating.

7. The negative electrode material according to claim 6, wherein the carbon coating has a thickness of 1 to 100 nm.

* * * * *